(12) United States Patent
Shiomi et al.

(10) Patent No.: US 9,368,153 B2
(45) Date of Patent: Jun. 14, 2016

(54) DISC CARTRIDGE AND DISC DEVICE

(71) Applicant: Panasonic Intellectual Property Management Co., Ltd., Osaka (JP)

(72) Inventors: Kenji Shiomi, Osaka (JP); Yukio Morioka, Osaka (JP); Yuji Ariyoshi, Osaka (JP); Masakazu Ishizuka, Hyogo (JP); Yasuhisa Fukushima, Osaka (JP)

(73) Assignee: PANASONIC INTELLECTUAL PROPERTY MANGEMENT CO., LTD., Osaka (JP)

(*) Notice: Subject to any disclaimer, the term of this patent is extended or adjusted under 35 U.S.C. 154(b) by 0 days.

(21) Appl. No.: 14/619,294

(22) Filed: Feb. 11, 2015

(65) Prior Publication Data
US 2015/0155005 A1     Jun. 4, 2015

Related U.S. Application Data

(63) Continuation of application No. PCT/JP2014/002139, filed on Apr. 15, 2014.

(30) Foreign Application Priority Data

Apr. 16, 2013  (JP) ................................. 2013-085782

(51) Int. Cl.
*G11B 23/03* (2006.01)
*G11B 23/023* (2006.01)
*G11B 17/043* (2006.01)

(52) U.S. Cl.
CPC .............. *G11B 23/03* (2013.01); *G11B 23/023* (2013.01); *G11B 23/0308* (2013.01); *G11B 23/0323* (2013.01); *G11B 17/0436* (2013.01)

(58) Field of Classification Search
CPC .............................. G11B 23/023; G11B 23/03
USPC ........................................ 720/643–644, 738
See application file for complete search history.

(56) References Cited

U.S. PATENT DOCUMENTS

| 5,497,279 A * | 3/1996 | Nishijima et al. ......... 360/96.51 |
| 5,503,348 A * | 4/1996 | Mizutani et al. ........... 242/347.1 |
| 2007/0130579 A1* | 6/2007 | Owens et al. ................ 720/718 |

FOREIGN PATENT DOCUMENTS

| JP | 63-24778 | 2/1988 |
| JP | 05-242638 | 9/1993 |

(Continued)

OTHER PUBLICATIONS

International Search Report issued Jul. 15, 2014 in International (PCT) Application No. PCT/JP2014/002139.

(Continued)

*Primary Examiner* — Carlos E Garcia
(74) *Attorney, Agent, or Firm* — Wenderoth, Lind & Ponack, L.L.P.

(57) ABSTRACT

A disc device records or reproduces information in or from a disc stored in a disc cartridge. The disc cartridge includes a casing having a front face with an opening for receiving the disc; and a cover closing the opening of the casing. The cover includes a slider moving along a side face of the casing, a shutter closing the opening; and a hinge part rotatably coupling the shutter to the slider. The disc device includes a stopper contacting the slider when the disc cartridge is inserted into the disc device to restrict movement of the slider in an insertion direction, and a cam part separating the hinge part from a contact region between the shutter and the casing when or before the casing further moves with the stopper restricting movement of the slider and the shutter is pressed by the casing to rotate about the hinge part.

12 Claims, 31 Drawing Sheets

(56) References Cited

FOREIGN PATENT DOCUMENTS

| | | |
|---|---|---|
| JP | 06-027033 | 7/1994 |
| JP | 2001-035117 | 2/2001 |
| JP | 2002-313058 | 10/2002 |
| JP | 2006-120296 | 5/2006 |

OTHER PUBLICATIONS

International Preliminary Report on Patentability and Written Opinion of the International Searching Authority mailed Oct. 29, 2015 in International (PCT) Application No. PCT/JP2014/002139.

* cited by examiner

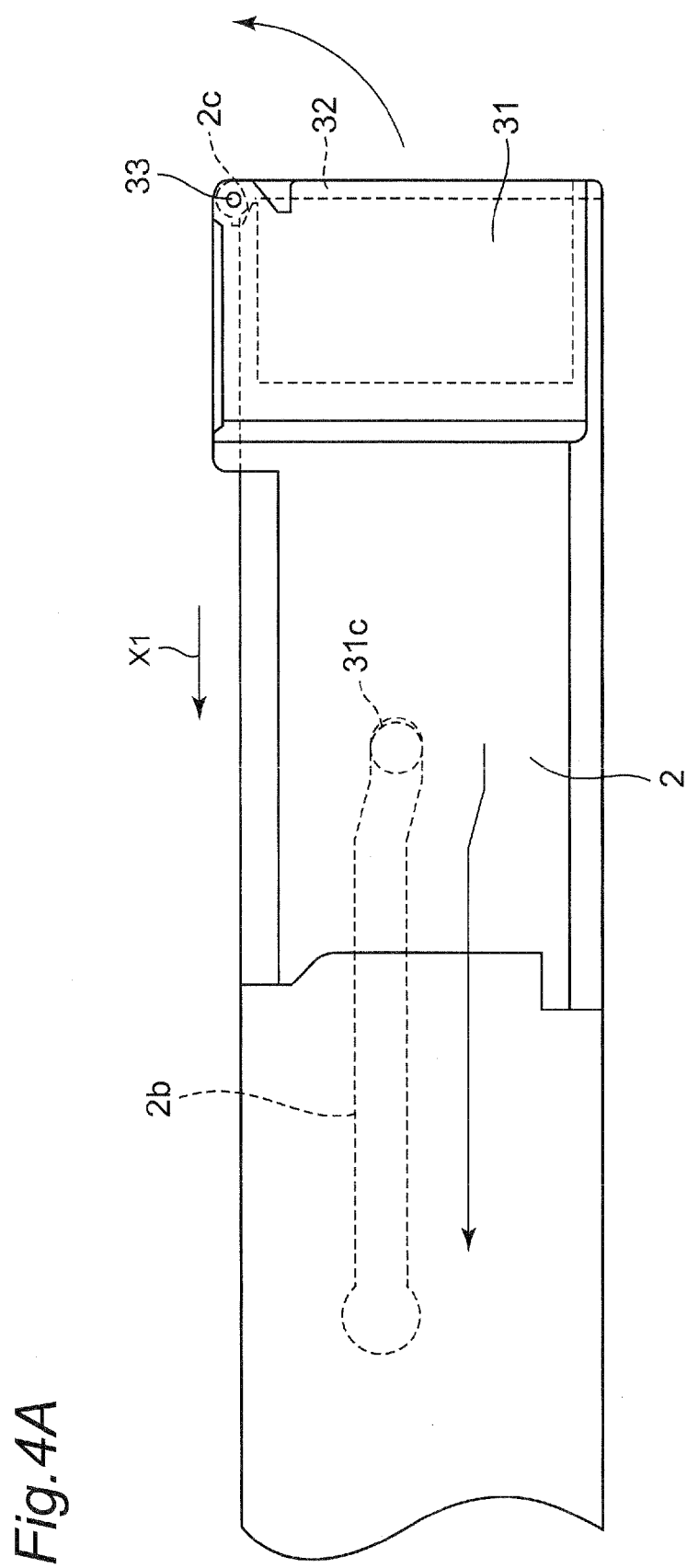

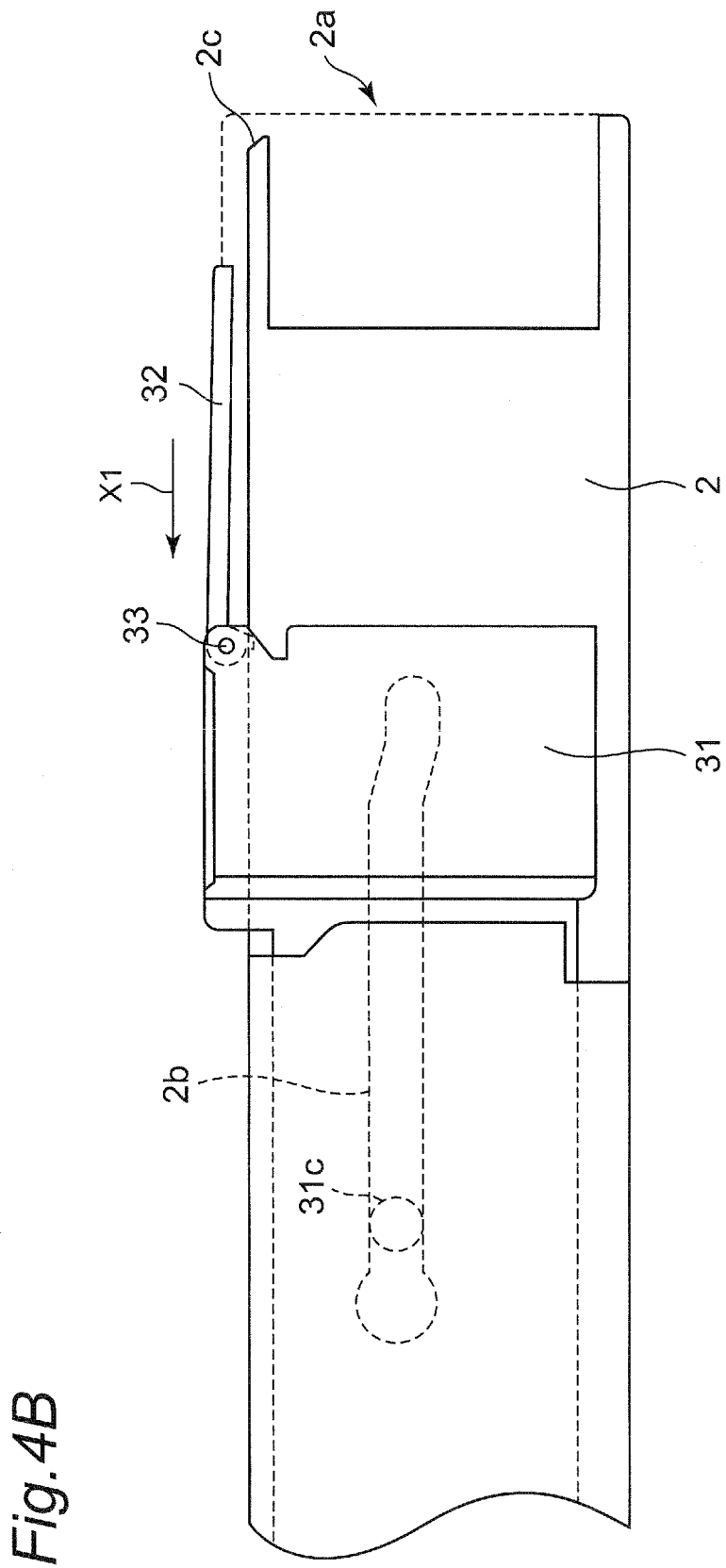

Fig.5
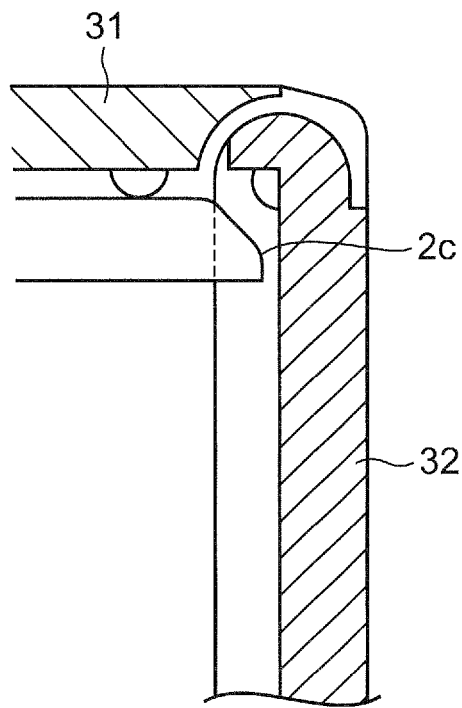
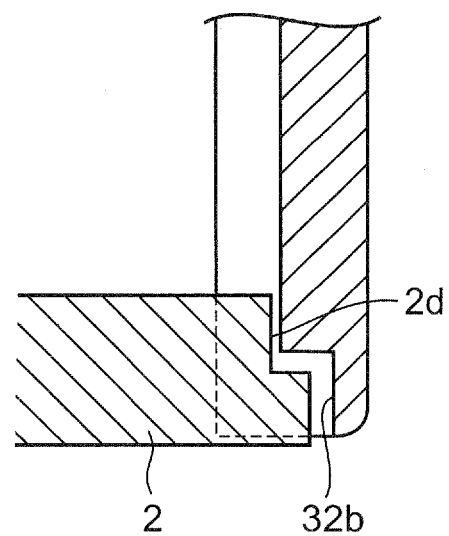

DISC CARTRIDGE AND DISC DEVICE

CROSS-REFERENCE TO RELATED APPLICATIONS

This is a continuation application of International Application No. PCT/JP2014/002139, with an international filing date of Apr. 15, 2014, which claims priority of Japanese Patent Application No. 2013-085782 filed on Apr. 16, 2013, the content of which is incorporated herein by reference.

BACKGROUND OF THE INVENTION

1. Technical Field

The present disclosure relates to a disc cartridge for storing a disc, and a disc device for recording and reproducing information in and from the disc stored in the disc cartridge.

2. Description of the Related Art

Conventional cartridges for storing an information recording medium such as a disc, for example, a cartridge as shown in FIG. 29 and FIG. 30, are known (Refer to Japanese Unexamined Utility Model Application Publication No. 63-024778 or Japanese Examined Utility Model Application Publication No. 6-27033, for example).

As shown in FIG. 29, the conventional cartridge includes a casing 101 and a cover 102 that covers the front of the casing 101. As shown in FIG. 30, a casing 101 stores a magnetic tape 103. The cover 102 can rotate about a rotary shaft 104 so as to expose the magnetic tape 103.

SUMMARY

Slimming and miniaturization of a record and reproduction device such as the disc device are in demand. In the conventional record and reproduction device for recording or reproducing information in or from the magnetic tape 103, as shown in FIG. 30, information is recorded or reproduced in the state where the cover 102 is rotated so as to expose the magnetic tape 103. Thus, it is needed to ensure a space for rotation of the cover 102 in the device so as not to interfere with the rotation of the cover 102. Therefore, the conventional record and reproduction device cannot be slimmed and miniaturized.

The present disclosure provides a disc cartridge and a disc device that can be slimmed and miniaturized.

A disc device of the present disclosure is a disc device recording or reproducing information in or from a disc stored in a disc cartridge, wherein the disc cartridge includes:
a casing having a front face with an opening configured to receive the disc; and
a cover configured to open and close the opening of the casing,
the cover includes:
a slider configured to move along a side face of the casing;
a shutter configured to close the opening; and
a hinge part configured to rotatably couple the shutter to the slider, and
the disc device includes:
a stopper configured to contact the slider when the disc cartridge is inserted into the disc device to restrict movement of the slider in an insertion direction; and
a cam part configured to separate the hinge part from a contact region between the shutter and the casing when or before the casing further moves in the insertion direction with the stopper restricting movement of the slider in the insertion direction and the shutter is pressed by the casing to rotate about the hinge part.

A disc cartridge of the present disclosure is a disc cartridge comprising:
a casing having a front face with an opening configured to receive the disc; and
a cover configured to open and close the opening of the casing, wherein
the cover includes:
a slider configured to move along a side face of the casing;
a shutter configured to close the opening; and
a hinge part configured to rotatably couple the shutter to the slider, and
the disc cartridge is configured that, when the slider moves in a depth direction away from the opening, the shutter is pressed by the casing to rotate about the hinge part, the opening is opened, and the hinge part is separated from a contact region between the shutter and the casing.

The disc cartridge and the disc device of the present disclosure can be slimmed and miniaturized.

BRIEF DESCRIPTION OF THE DRAWINGS

These and other objects and features of the present disclosure become apparent from following description about an embodiment shown in appended figures. In these figures.

FIG. 4A is a side view schematically showing the state where the cover in FIG. 1 closes an opening of a casing;

FIG. 4B is a side view schematically showing the state where the cover in FIG. 1 opens the opening of the casing;

FIG. 5 is a vertical sectional view showing an example of a shutter provided at the cover in FIG. 1;

DETAILED DESCRIPTION

Figure 1:
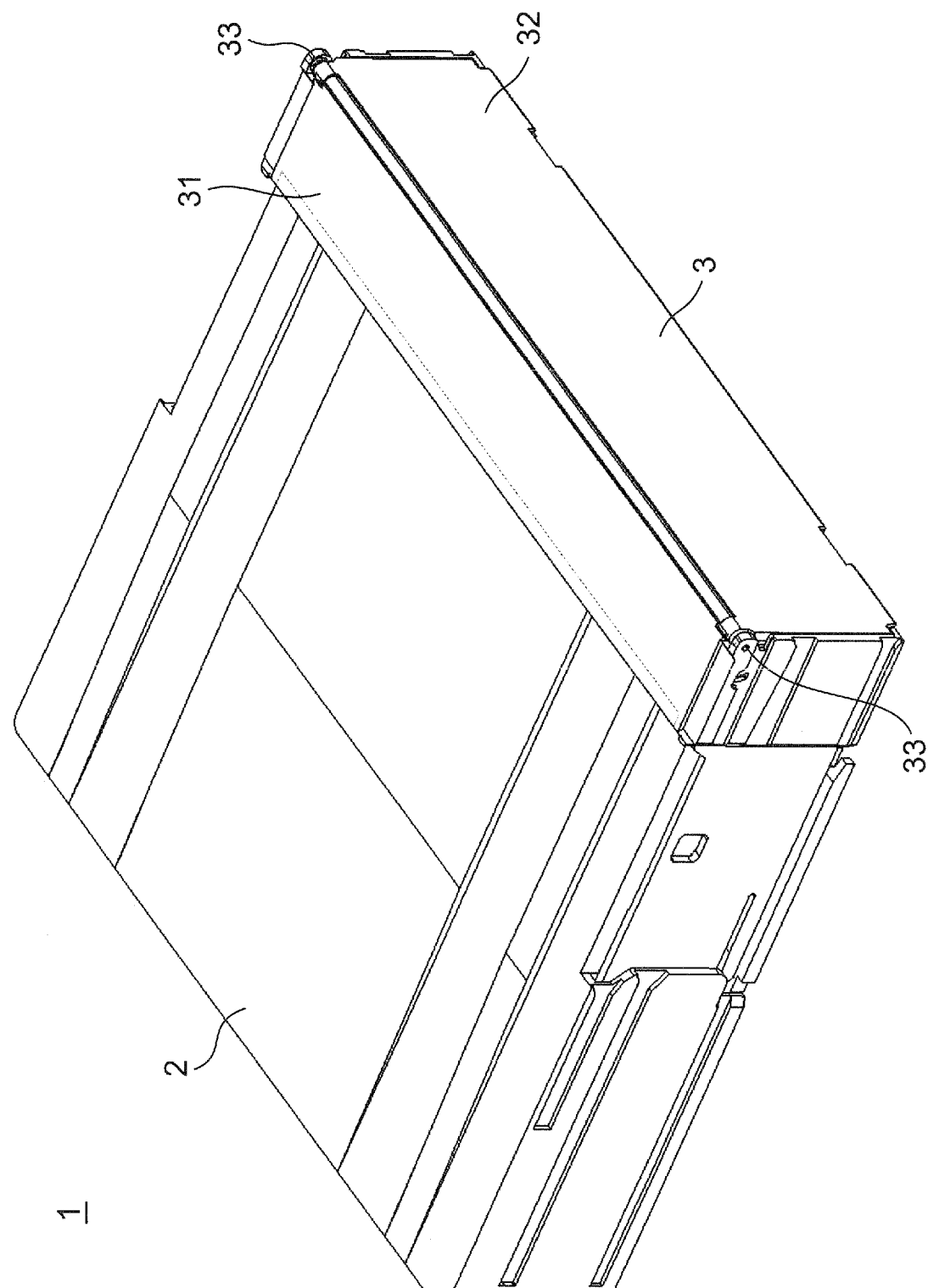
FIG. 1 is a perspective view of a disc cartridge in accordance with an embodiment, with a cover being closed.

A first aspect of the present disclosure provides a disc device recording or reproducing information in or from a disc stored in a disc cartridge, wherein
the disc cartridge includes:
  a casing having a front face with an opening configured to receive the disc; and
  a cover configured to open and close the opening of the casing,
the cover includes:
  a slider configured to move along a side face of the casing;
  a shutter configured to close the opening; and
  a hinge part configured to rotatably couple the shutter to the slider, and
the disc device includes:
  a stopper configured to contact the slider when the disc cartridge is inserted into the disc device to restrict movement of the slider in an insertion direction; and
  a cam part configured to separate the hinge part from a contact region between the shutter and the casing when or before the casing further moves in the insertion direction with the stopper restricting movement of the slider in the insertion direction and the shutter is pressed by the casing to rotate about the hinge part.

A second aspect of the present disclosure provides the disc device according to the first aspect, wherein the casing includes an inclined face configured to move the slider in the same direction as a direction in which the hinge part moves when or after the casing moves in the insertion direction and the hinge part is moved by the cam part so as to be away from the contact region.

A third aspect of the present disclosure provides the disc device according to the second aspect, wherein the inclined face is inclined from an inner side toward an outer side of the casing in a thickness direction of the casing, along the insertion direction.

A fourth aspect the present disclosure provides the disc device according to the second aspect, wherein the casing includes a flat face extending from a top of the inclined face toward an upstream side of the insertion direction, and
  in the state where the shutter closes the opening, the flat face is substantially flush with a part of an outer face of the slider.

A fifth aspect of the present disclosure provides a disc cartridge comprising:
  a casing having a front face with an opening configured to receive the disc; and
  a cover configured to open and close the opening of the casing, wherein
the cover includes:
  a slider configured to move along a side face of the casing;
  a shutter configured to close the opening; and
  a hinge part configured to rotatably couple the shutter to the slider, and
the disc cartridge is configured that, when the slider moves in a depth direction away from the opening, the shutter is pressed by the casing to rotate about the hinge part, the opening is opened, and the hinge part is separated from a contact region between the shutter and the casing.

A sixth aspect of the present disclosure provides the disc cartridge according to the fifth aspect, wherein the casing includes an inclined face configured to move the slider so as to separate the hinge part from the contact region when the slider moves in the depth direction.

A seventh aspect of the present disclosure provides the disc cartridge according to the sixth aspect, wherein the inclined face is inclined from an inner side toward an outer side of the casing in a thickness direction of the casing, along the depth direction.

An eighth aspect of the present disclosure provides the disc cartridge according to the sixth aspect, wherein the casing includes a flat face extending from a top of the inclined face toward a downstream side in the depth direction, and
  in the state where the shutter closes the opening, the flat face is substantially flush with a part of an outer face of the slider.

A ninth aspect of the present disclosure provides the disc cartridge according to the fifth aspects, wherein the shutter functions as a strut configured to prevent the casing from bending in the thickness direction when the shutter closes the opening.

A tenth aspect of the present disclosure provides the disc cartridge according to the ninth aspect, wherein one of the shutter and the casing is provided with a recess portion, the other of the shutter and the casing is provided with a projection configured to be received in the recess portion, and in the state where the shutter closes the opening, the projection is located opposed to the recess portion.

An eleventh aspect of the present disclosure provides the disc cartridge according to tenth aspect, wherein when a force acts in the thickness direction of the casing in the state where the shutter closes the opening, the projection enters into the recess portion to restrict movement of the shutter.

A twelfth aspect of the present disclosure provides the disc cartridge according to the fifth aspects, wherein a rib extending in the thickness direction of the casing is provided on a face of the shutter, the face closing the opening.

The embodiment will be described below in detail with reference to figures. However, detailed description than needed may be omitted. For example, detailed description of well-known matters and overlapping description of the same configuration may be omitted. This can prevent the following description from being redundant than needed, and facilitate understanding of those skilled in the art.

The inventors provide the appended figures and the following description to make those skilled in the art fully understand the present disclosure, and do not intend to limit the subject matter recited in Claims.

(Embodiment)

Figure 2:
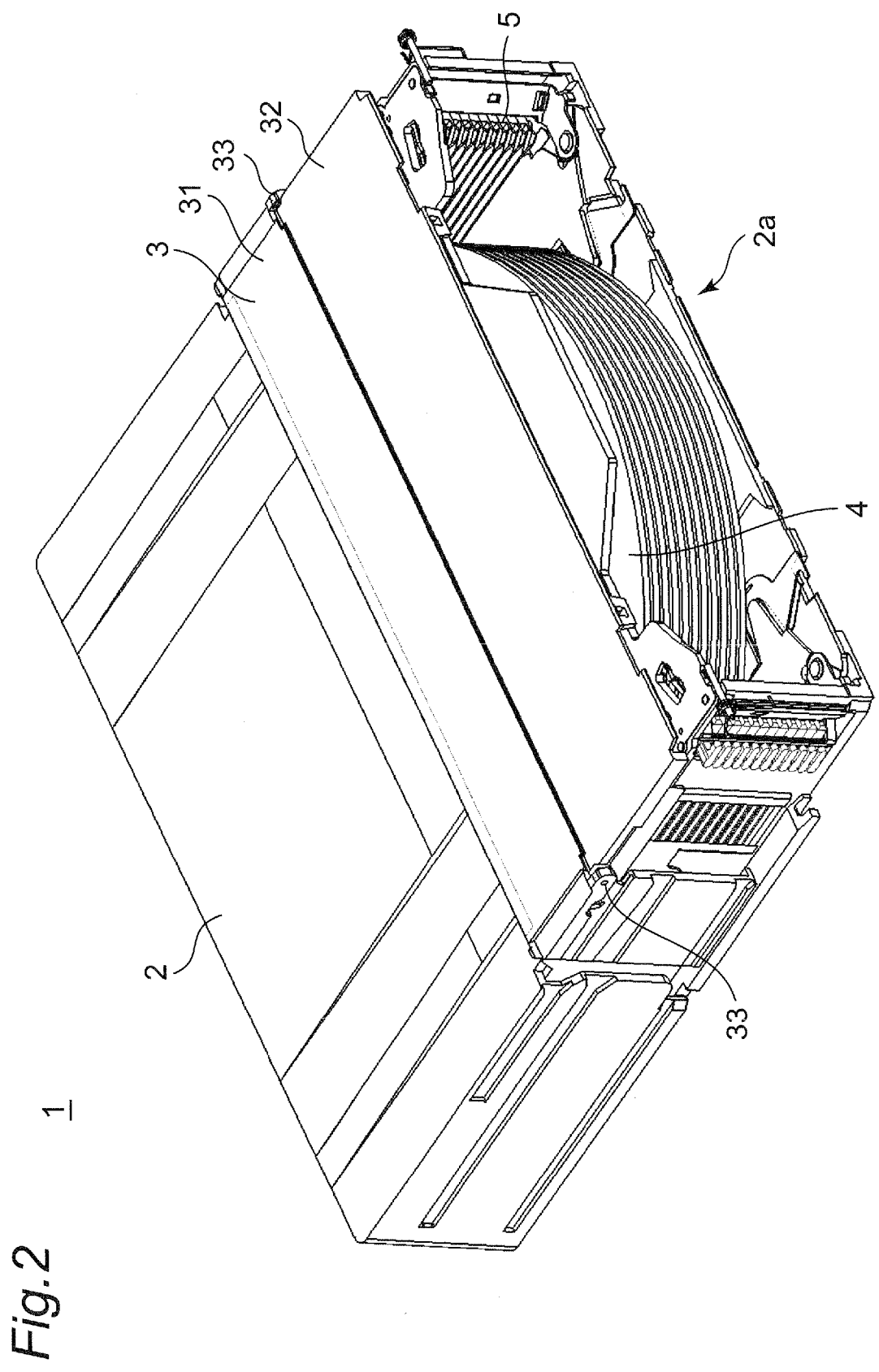
FIG. 2 is a perspective view of the disc cartridge in accordance with the embodiment, with the cover being opened.

A disc cartridge in accordance with an embodiment will be described below. FIG. 1 is a perspective view showing the state where a cover of the disc cartridge in this embodiment is closed. FIG. 2 is a perspective view showing the state where the cover of the disc cartridge in this embodiment is opened. The disc cartridge 1 in this embodiment is substantially bilaterally-symmetric when viewed from the front (viewed from the lower right toward the upper left in FIG. 1). For parts having the same or similar structure in a right portion and a left portion of the disc cartridge 1, one will be described, and the other is omitted in description as appropriate.

As shown in FIG. 1, the disc cartridge 1 in this embodiment includes a casing 2 and a cover 3. As shown in FIG. 2, the casing 2 can store a plurality of discs 4. A disc holder 5 for holding the plurality of discs 4 is provided in the casing 2. A front face of the casing 2 has an opening 2a for receiving the plurality of discs 4. The cover 3 can open/close the opening 2a of the casing 2.

Figure 3:
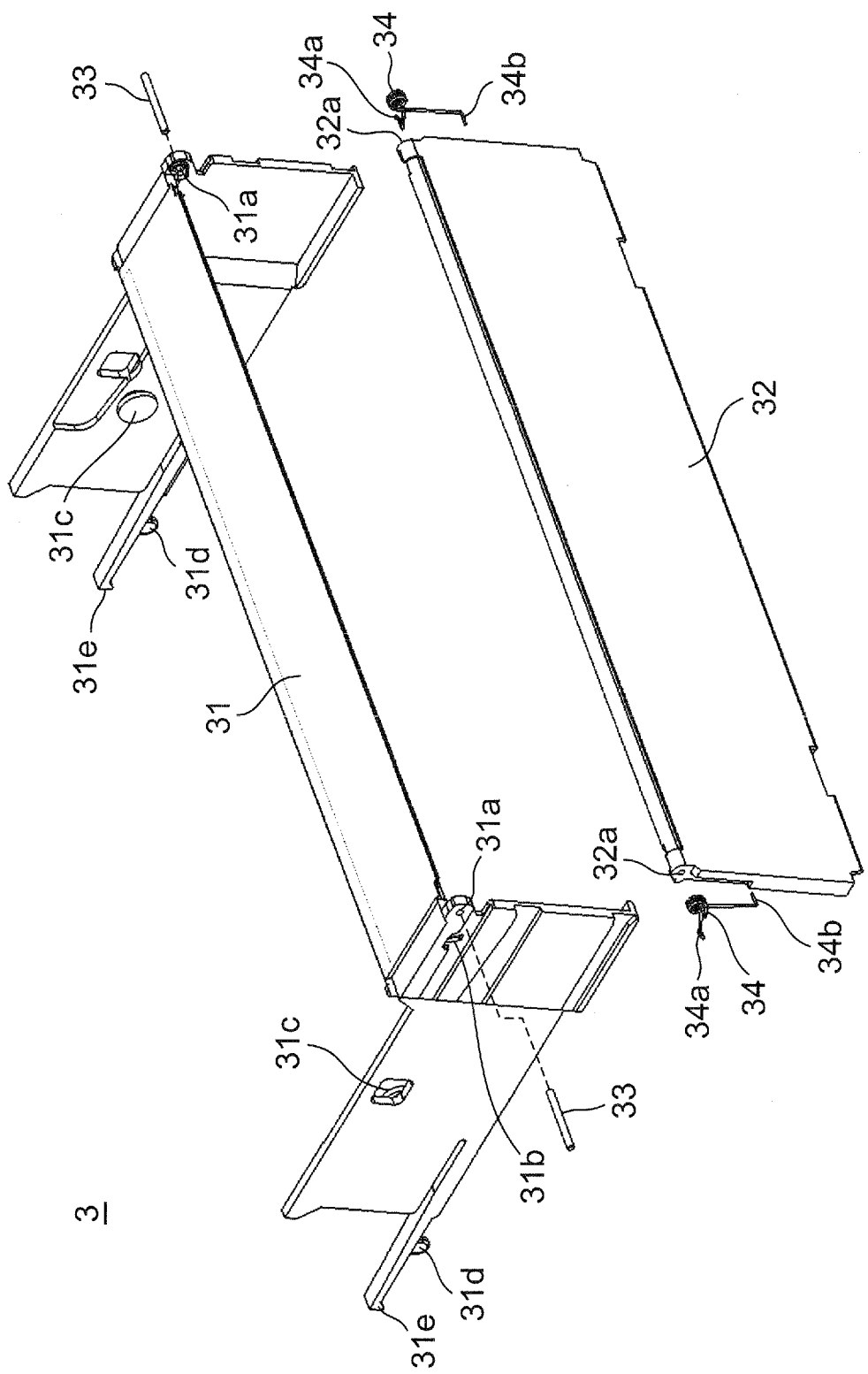
FIG. 3 is an exploded perspective view of the cover in FIG. 1.

FIG. 3 is an exploded perspective view of the cover 3. The cover 3 includes a slider 31, a shutter 32, two hinge pins 33 as an example of a hinge part, and two torsion coil springs 34 as an example of a biasing member.

As shown in FIG. 3, the slider 31 is a rectangular top plate connecting front upper edges of two side plates to each other. As shown in FIG. 1 and FIG. 2, the slider 31 can move along side faces of the casing 2. As shown in FIG. 1, the shutter 32 closes the opening 2a of the casing 2.

A pin hole 31a is provided at a front upper corner of each of side plates of the slider 31. A pin hole 32a is provided at an upper end of each of side faces of the shutter 32. Each hinge pin 33 is inserted into the pin hole 31a, a center hole of the torsion coil spring 34, and the pin hole 32a in this order, thereby rotatably coupling the slider 31 with the shutter 32.

Each torsion coil spring 34 is attached so as to bias the shutter 32 to close the opening 2a. More specifically, each torsion coil spring 34 engages with a cam part (second cam part) 31b provided on the slider 31 at one end 34a, and engages with the side face of the shutter 32 at the other end 34b.

FIG. 4A and FIG. 4B are side views schematically showing a shift from the state where the cover 3 close the opening 2a of the casing 2 to the state where the cover 3 opens the opening 2a of the casing 2. As shown in FIG. 4A and FIG. 4B, a cam groove 2b extending in a depth direction X1 away from the opening 2a is formed in each side wall of the casing 2. As shown in FIG. 3, FIG. 4A, and FIG. 4B, engaging pins 31c that can engage with the respective cam grooves 2b and slidably move are provided on the side walls of the slider 31 opposed to the casing 2. The engaging pins 31c slide in the respective cam grooves 2b, thereby guiding the movement of the slider 31 in the depth direction X1.

When the slider 31 moves in the depth direction X1, the shutter 32 coupled to the slider 31 with the hinge pins 33 also moves in the depth direction X1. At this time, the shutter 32 is pressed by front upper ends 2c of the casing 2 and thus moved in the depth direction X1 while rotating about the hinge pins 33. This opens the opening 2a.

In the disc cartridge 1 in this embodiment, the cover 3 is divided into the slider 31 and the shutter 32, and the slider 31 is rotatably coupled to the shutter 32. When the slider 31 moves in the depth direction X1, the shutter 32 is pressed by the casing 2 to rotate, opening the opening 2a. With such configuration, the cover 3 moves along the side faces of the casing 2, reducing the space for rotation of the cover 3 than conventional. As a result, the device can be slimmed and miniaturized.

In the rotation of the shutter 32 about the hinge pins 33, if a distance between the contact region of the shutter 32 and the front upper end 2c of the casing 2 and the hinge pin 33 is small, a load to rotate the shutter 32 becomes large. For this reason, the distance is increased when or before the shutter 32 rotates about the hinge pins 33. This can smoothly rotate the shutter 32. An example of the specific configuration will be described later in detail.

Figure 8:
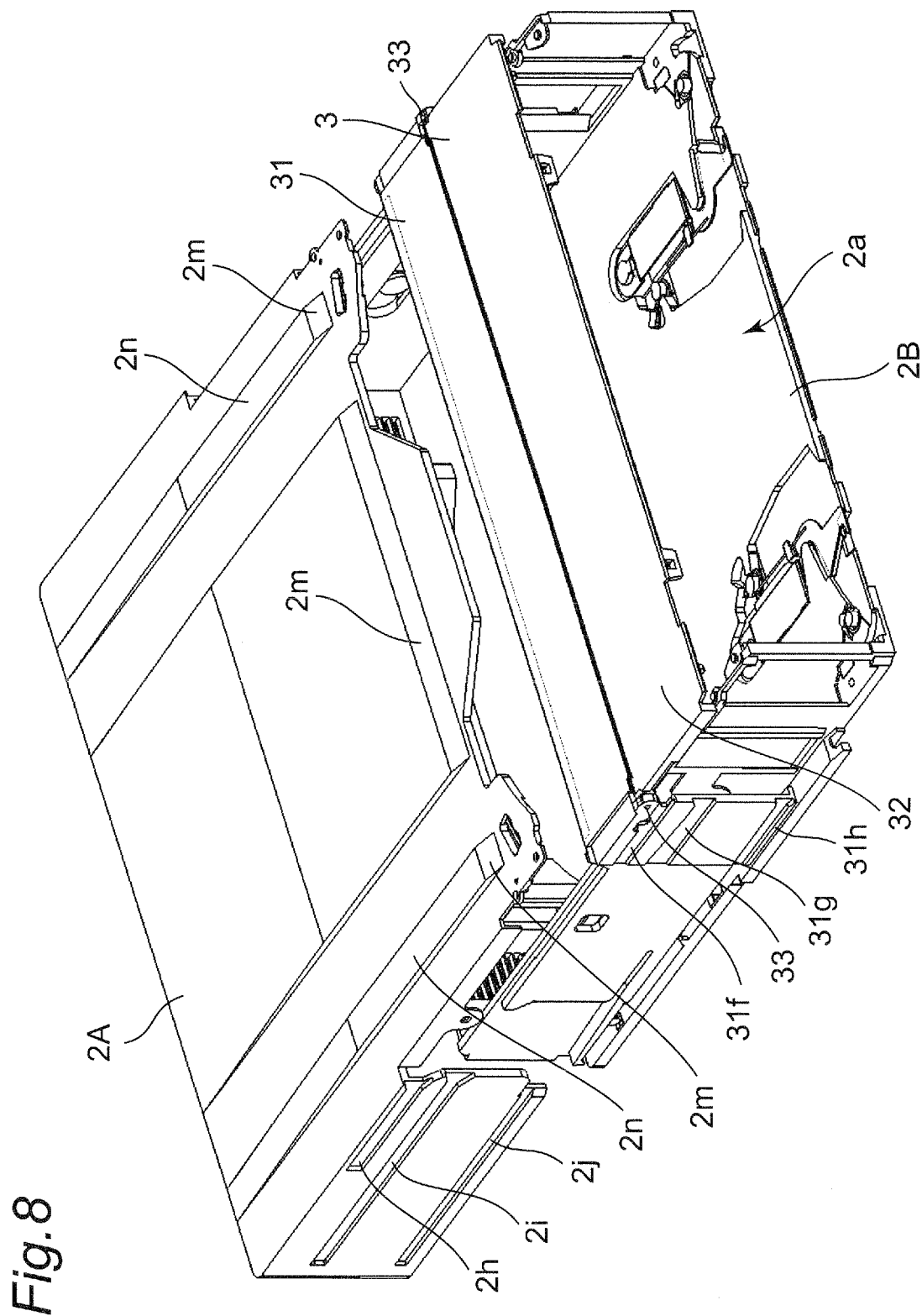
FIG. 8 is an exploded perspective view of the casing of the disc cartridge in FIG. 1.

As shown in FIG. 8, for example, the casing 2 has an inclined face 2m that causes the slider 31 to move away from the contact regions of the shutter 32 and the front upper ends 2c of the casing 2 when the slider 31 moves in the depth direction X1. The slider 31 slides on the inclined face 2m, thereby gradually increasing the distance between the contact regions and the hinge pins 33 and keeping the distance. For example, the inclined face 2m may be inclined from the inner side toward the outer side of the casing 2 in the thickness direction of the casing 2 as it moves in the depth direction X1.

For example, the casing 2 has a flat face 2n extending from the top of the inclined face 2m toward the downstream side in the depth direction X1, and in the state where the shutter 32 closes the opening 2a (See FIG. 1), the flat face 2n and a part of an outer face of the slider 31 are substantially flush with each other (are on the same level). This can suppress irregularities on an upper face of the casing 2, improving design.

The vicinity of the opening 2a of the casing 2 needs to be configured so as not to interfere with insertion of the disc 4. For this reason, a strut cannot be provided in the vicinity of the opening 2a of the casing 2, and therefore the casing 2 is weak against a force in the thickness direction. Thus, the shutter 32 functions as a strut for preventing the casing 2 from bending in the thickness direction in the state where the shutter closes the opening 2a (hereinafter referred to as closed state). For example, as shown in FIG. 5, a stepped portion 2d is provided at least at either of front lower corners of the casing 2 and a stepped portion 32b is provided at least at either of lower ends of the shutter 32, and when the shutter 32 is in the closed state, the stepped portion 2d of the casing 2 engages with the stepped portion 32b of the shutter 32. This can increase the resistance against the force acting on the casing 2 in the thickness direction.

Figure 6:
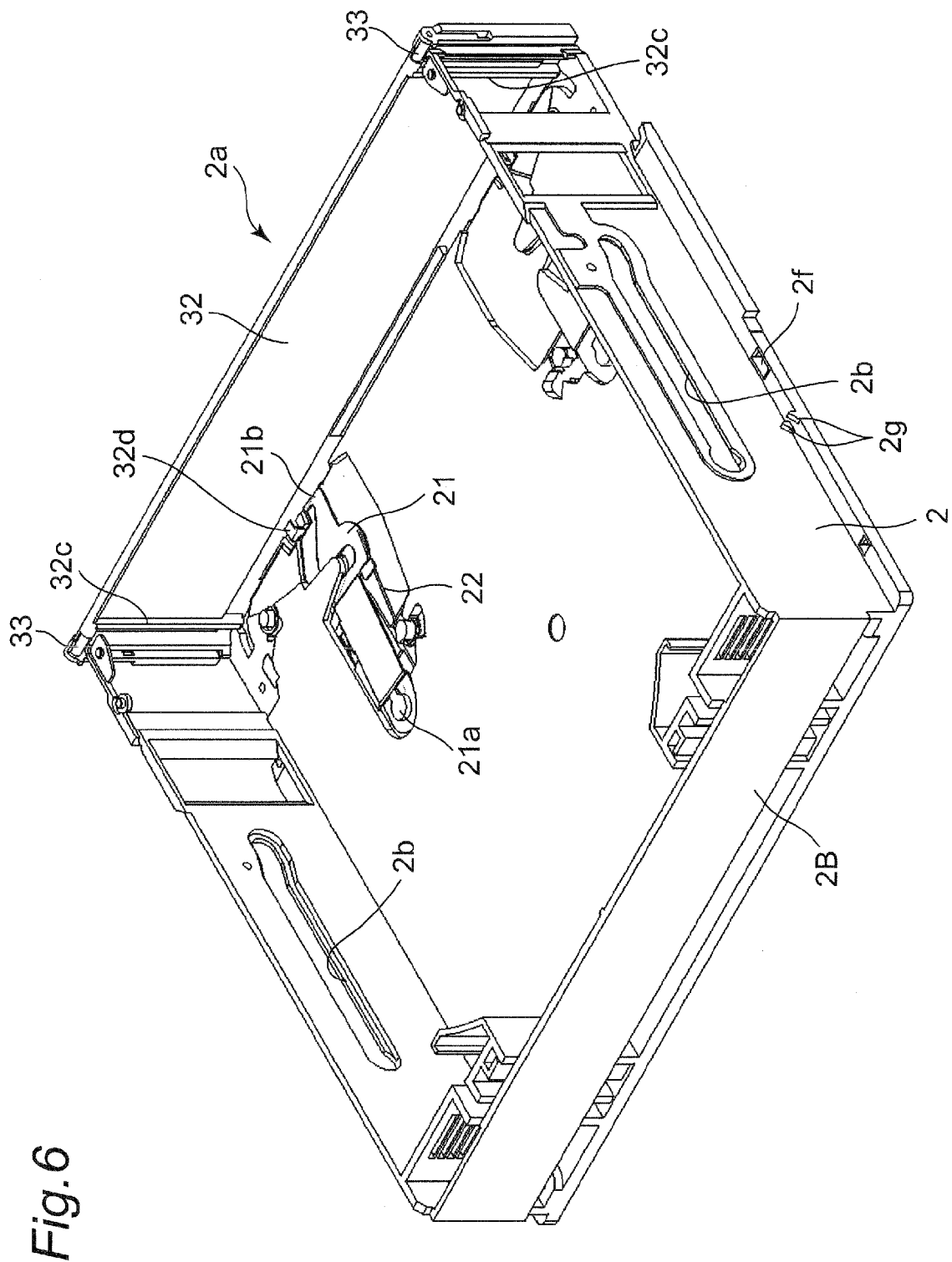
FIG. 6 is a perspective view showing the state where the shutter is attached to a lower case constituting the casing of the disc cartridge in FIG. 1, wherein a hook of a lock arm does not engage with a hook of the shutter.
Figure 7:
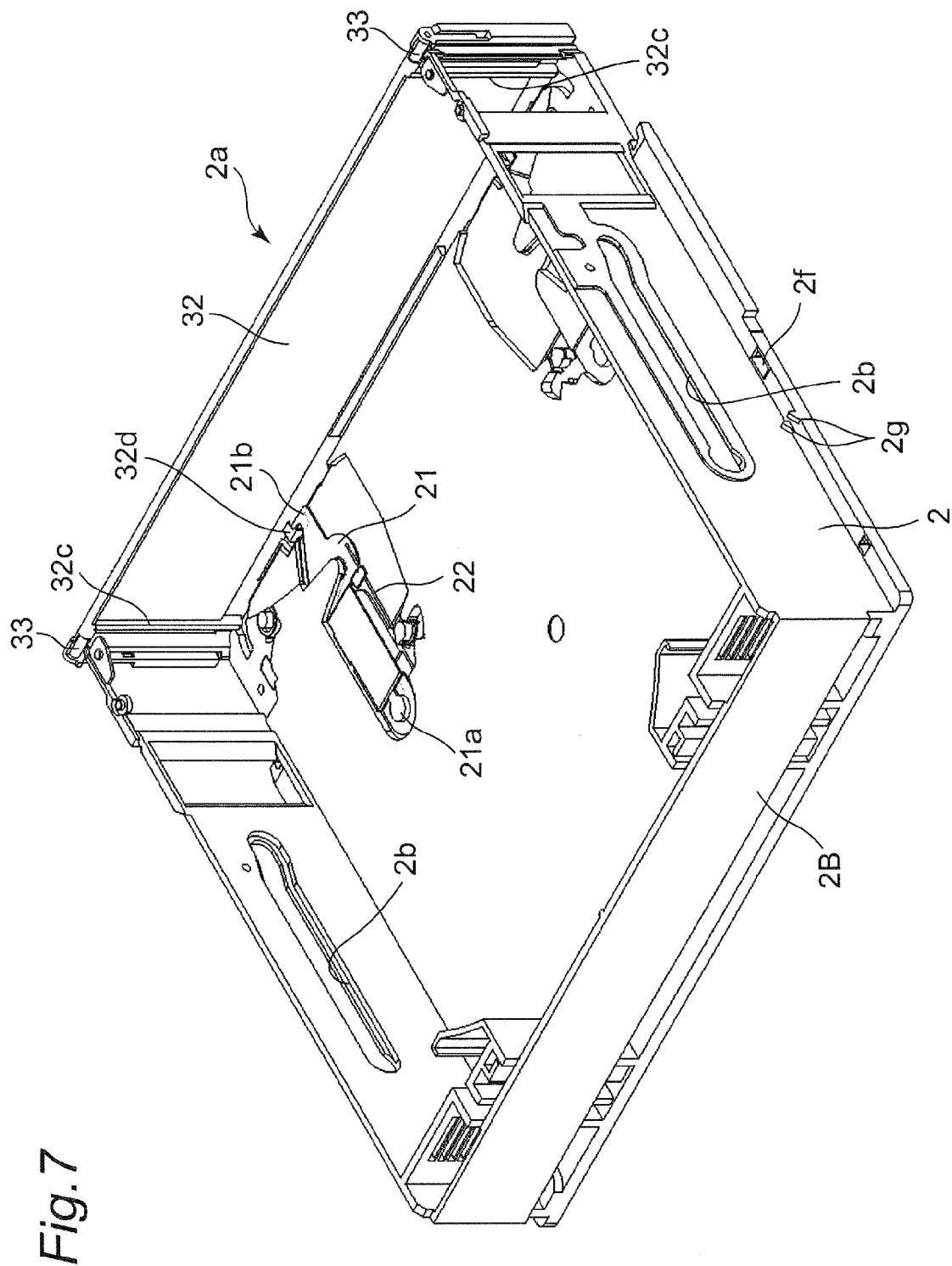
FIG. 7 is a perspective view showing the state where the shutter is attached to the lower case constituting the casing of the disc cartridge in FIG. 1, wherein the hook of the lock arm engages with the hook of the shutter.

For example, as shown in FIG. 6 and FIG. 7, one or more ribs 32c are provided on a face (inner face) of the shutter 32, which closes the opening 2a so as to extend in the thickness direction of the casing 2. This can further increase the resistance against the force acting on the casing 2 in the thickness direction.

In this embodiment, as shown in FIG. 8, the casing 2 is configured of an upper case 2A and a lower case 2B. FIG. 6 and FIG. 7 are perspective views showing the state where the shutter 32 is attached to the lower case 2B.

As shown in FIG. 6 and FIG. 7, lock arms 21 for holding the shutter 32 in the closed state are attached to a bottom wall of the lower case 2B so as to be rotatable about respective rotary shafts 21a. A front end of the lock arms 21 each are provided with a hook 21b that can engage with a hook 32d provided at a lower end of the inner face of the shutter 32. In this embodiment, as shown in FIG. 7, the hook 21b of the lock arms 21 engage with the hooks 32d of the shutter 32, thereby holding (locking) the shutter 32 in the closed state.

Torsion coil springs 22 for biasing the lock arms 21 are provided on the bottom wall of the lower case 2B at a position to engage the hooks 21b of the lock arms 21 with the hooks 32d of the shutter 32 (See FIG. 7).

To reliably engage the hooks 21b of the lock arms 21 with the hooks 32d of the shutter 32, the shutter 32 must be located at a predetermined position to close the opening 2a at engagement. This provides, for example, a biasing force increasing part for increasing a biasing force of the torsion coil springs 34 when or before the shutter 32 rotates to close the opening 2a. This can locate the shutter 32 at the predetermined position to close the opening 2a, and reliably engage the hooks 21b of the lock arms 21 with the hooks 32d of the shutter 32.

Figure 9:
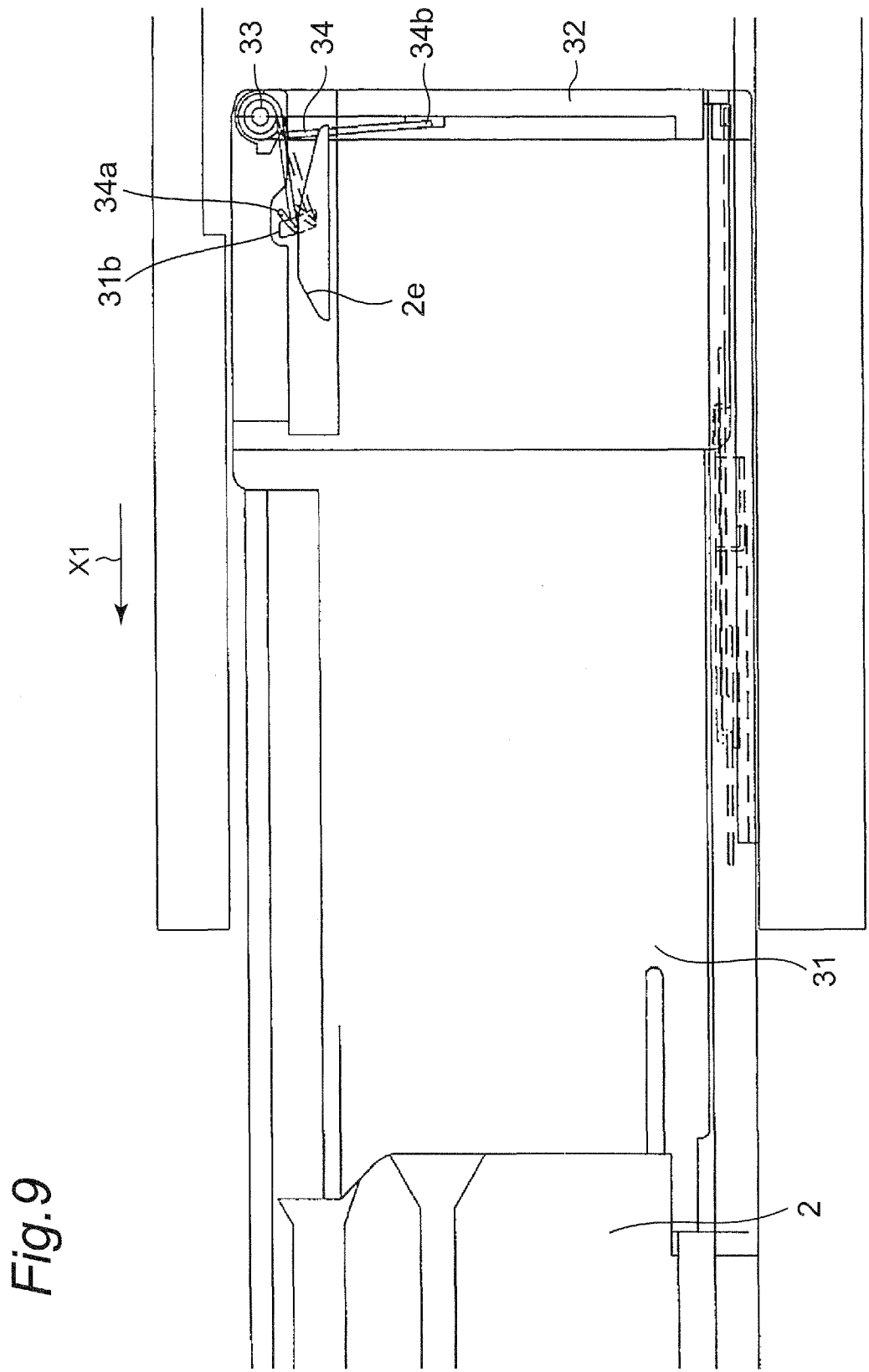
FIG. 9 is a side view showing an example of a biasing force increasing part for increasing a biasing force of a torsion coil spring biasing the shutter.

For example, such biasing force increasing part can be configured of first cam parts 2e and second cam parts 31b as shown in FIG. 9. The first cam parts 2e are provided on the side walls of the casing 2 so as to engage with the respective one ends 34a of the torsion coil springs 34. The second cam parts 31b are provided on the side walls of the slider 31 so as to engage with the respective one ends 34a of the torsion coil springs 34. When the slider 31 moves by a predetermined distance or more in the depth direction X1, the first cam parts 2e and the second cam parts 31b are configured to move the one ends 34a of the torsion coil springs 34 in the direction in which the biasing force of the torsion coil springs 34 increases (clockwise in FIG. 9).

As shown in FIG. 6 and FIG. 7, through holes 2f and stoppers 2g are provided on the bottom wall of the lower case 2B outside the side wall. As shown in FIG. 3, protrusions 31d provided at the rear end of the slider 31 can be inserted into the respective through holes 2f. By inserting the protrusions 31d into the through holes 2f, movement of the slider 31 relative to the casing 2 is locked. When the protrusions 31d are located in the through holes 2f, the stoppers 2g contact the respective protrusions 31e provided at the rear end of the slider 31 as shown in FIG. 3.

Figure 10:
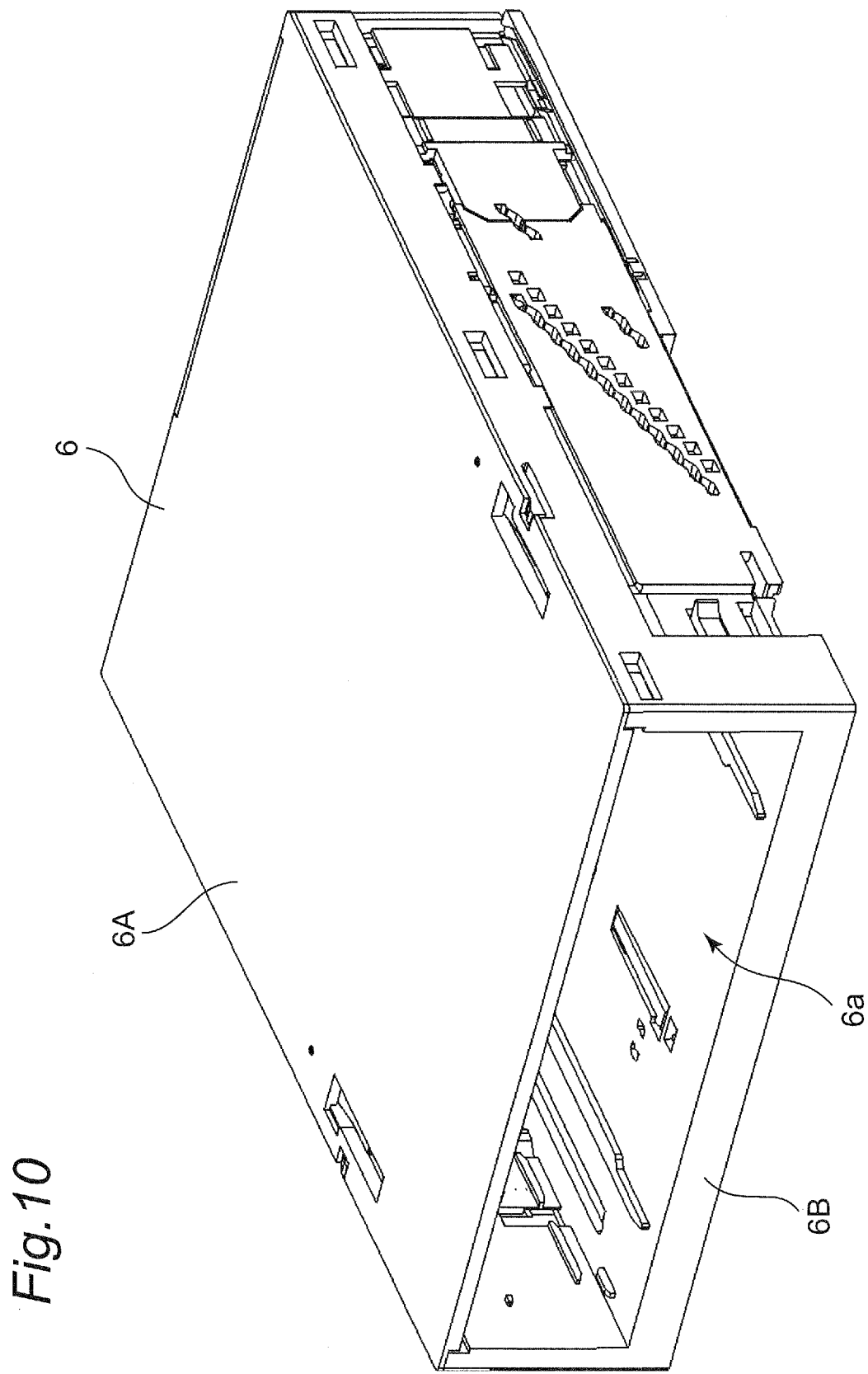
FIG. 10 is a perspective view of a disc device for recording or reproducing information in or from a disc stored in the disc cartridge in FIG. 1.
Figure 11:
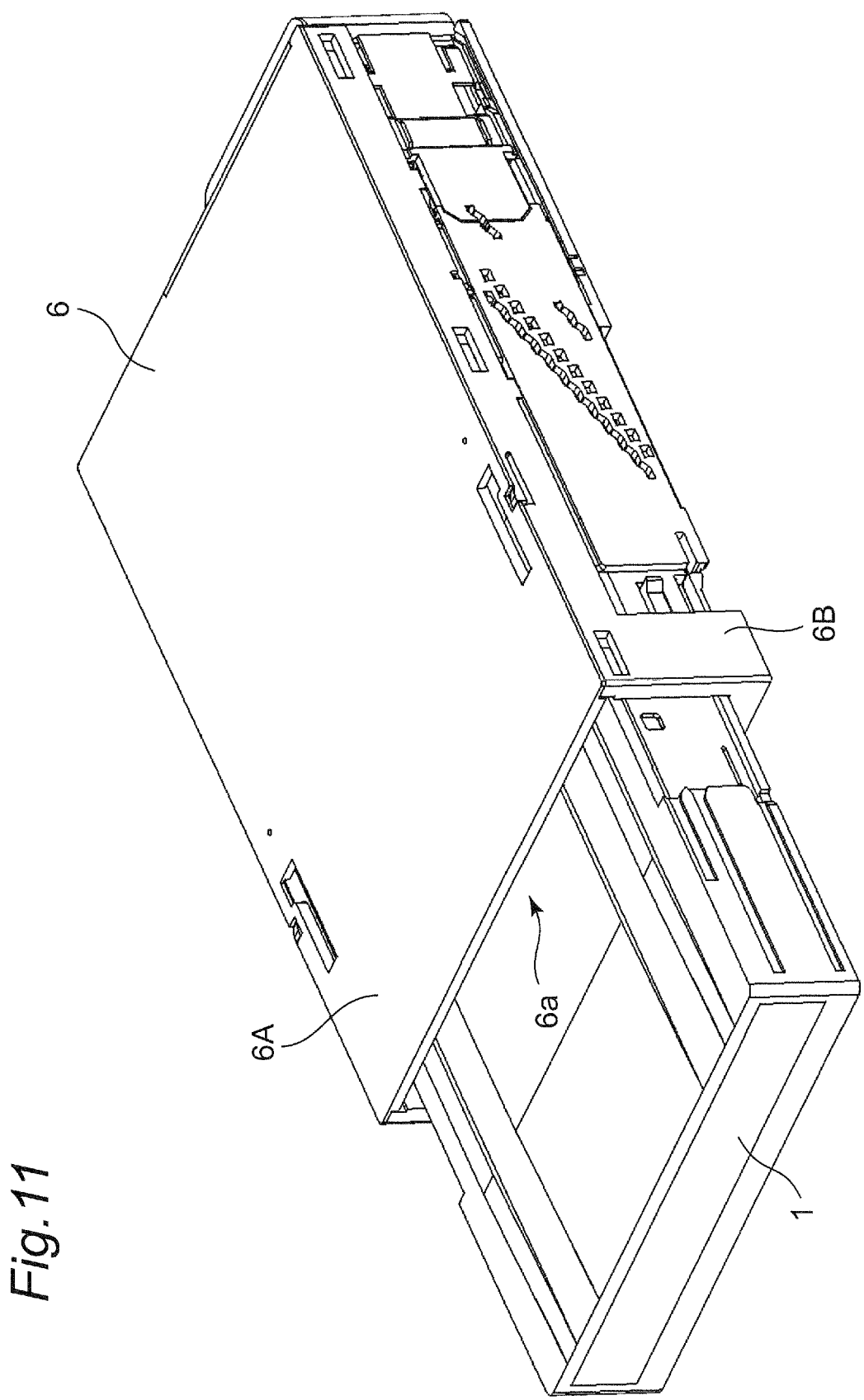
FIG. 11 is a perspective view showing the state where the disc cartridge in FIG. 1 is being inserted into the disc device in FIG. 10.
Figure 12:
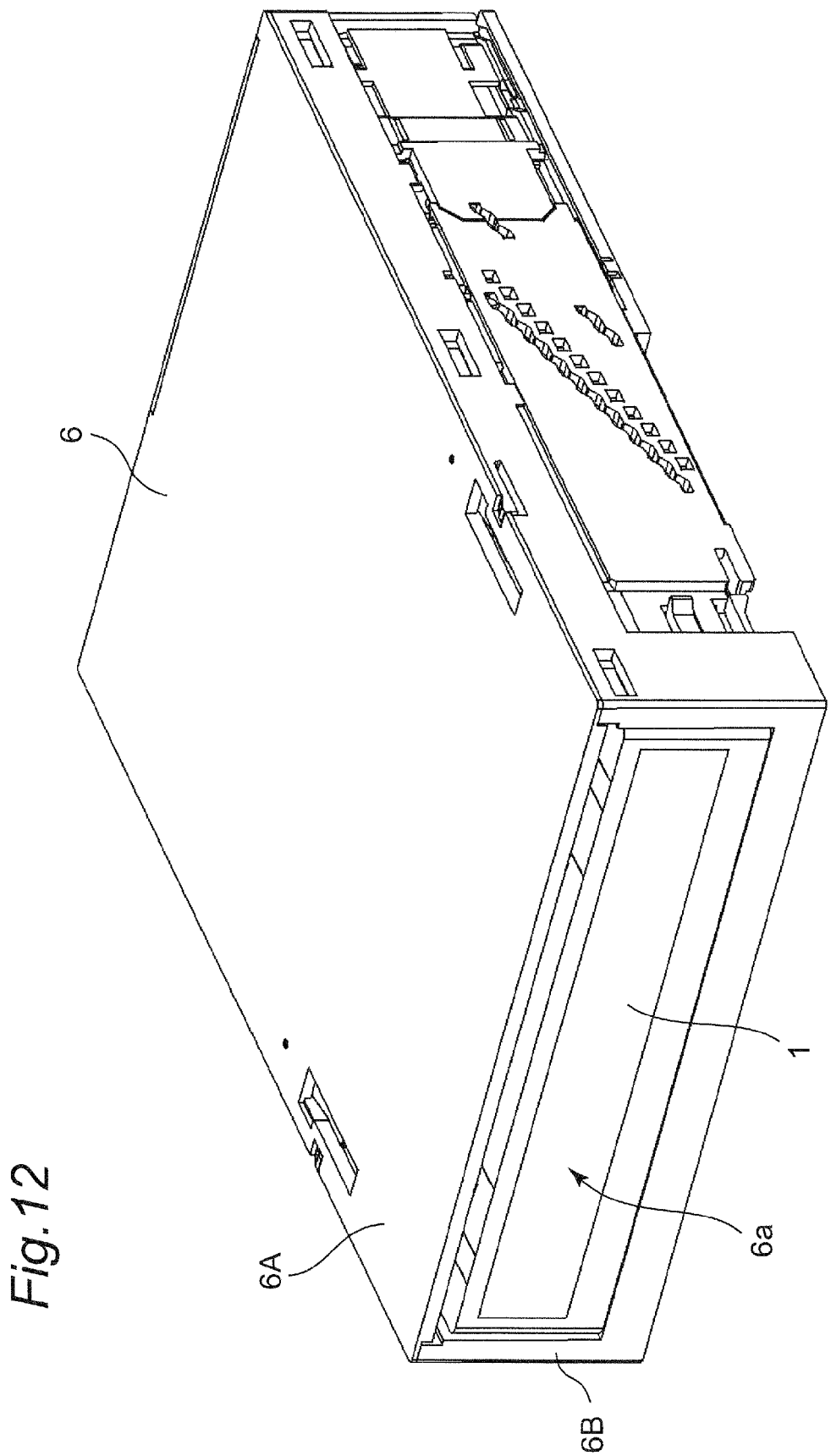
FIG. 12 is a perspective view showing the state where the disc cartridge in FIG. 1 has been inserted into the disc device in FIG. 10.

Next, configuration of a disc device 6 for recording or reproducing information in or from the disc 4 stored in the disc cartridge 1 in accordance with this embodiment is described. FIG. 10 is a perspective view of the disc device 6. FIG. 11 is a perspective view showing the state where the disc cartridge 1 is being inserted into the disc device 6. FIG. 12 is a perspective view showing the state where the disc cartridge 1 has been inserted into the disc device 6. It is noted that the disc device 6 is substantially bilaterally-symmetric when viewed from the front (viewed from the lower left toward the upper right in FIG. 10). For parts having the same or similar structure in a right portion and a left portion of the disc device 6, one will be described, and the other is omitted in description as appropriate.

The disc device 6 includes an upper plate 6A and a lower case 6B that constitute the casing. As shown in FIG. 10, a front face of the disc device 6 has an opening 6a into which the disc cartridge 1 is inserted. As shown in FIG. 11 and FIG. 12, the disc cartridge 1 is inserted into the disc device 6 from the side of the cover 3. A disc drive (not shown) including a spindle motor and an optical pick-up is mounted at the back of the disc device 6 away from the opening 6a. Detailed description of the configuration of the disc drive is omitted.

Figure 13:
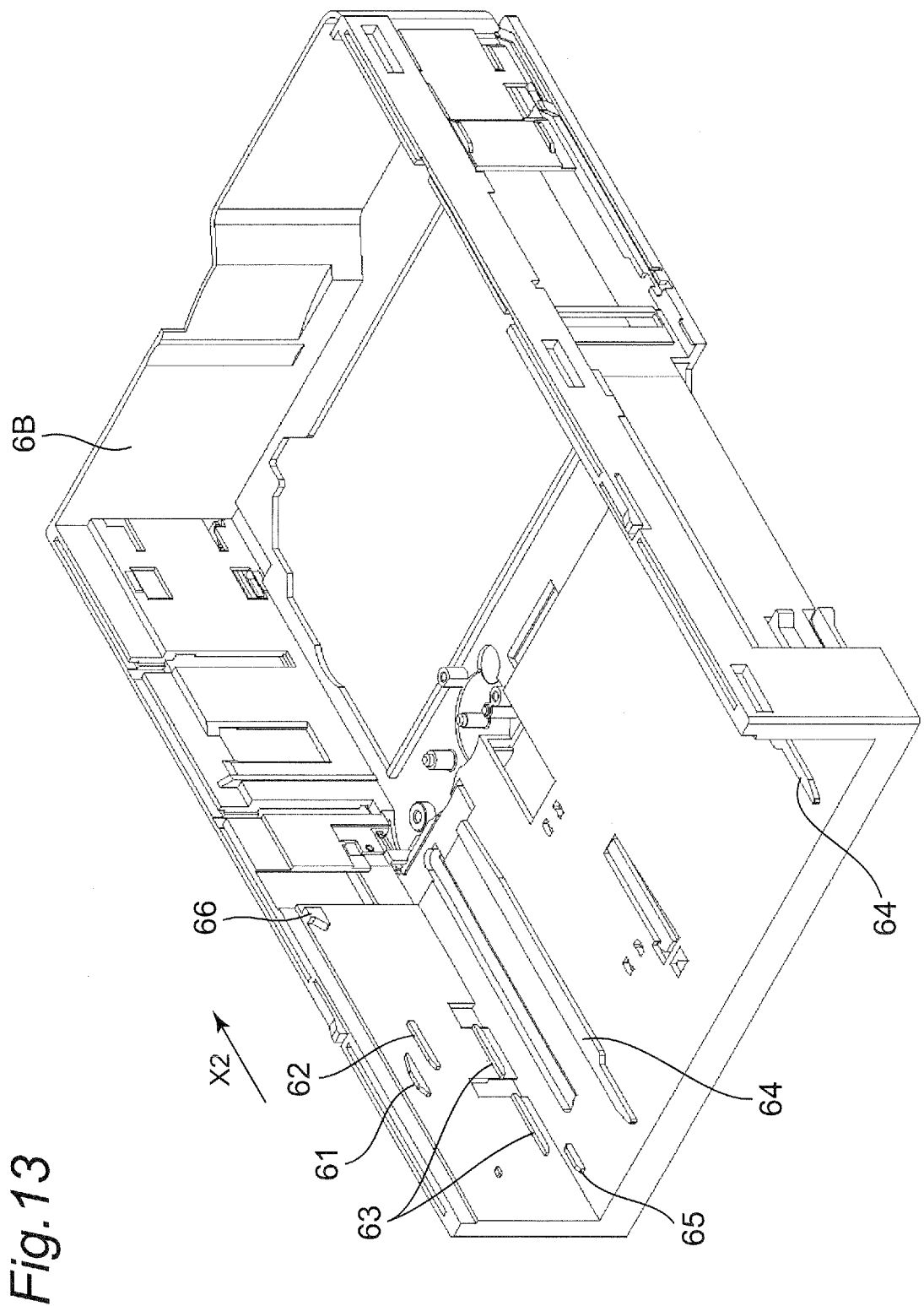
FIG. 13 is a perspective view of a lower case of the disc device in FIG. 10.

FIG. 13 is a perspective view of the lower case 6B of the disc device 6. As shown in FIG. 13, the lower case 6B is provided with first to fifth guide protrusions 61 to 65 each extending in an insertion direction X2.

The first to third guide protrusions 61 to 63 are provided on inner faces of both side walls of the lower case 6B. The first to third guide protrusions 61 to 63 can slide in guide grooves 31f to 31h provided in outer faces of both side walls of the slider 31 and guide grooves 2h to 2j provided in outer faces of both side walls of the upper case 2A of the disc cartridge 1 as shown in FIG. 8, respectively.

Figure 14:
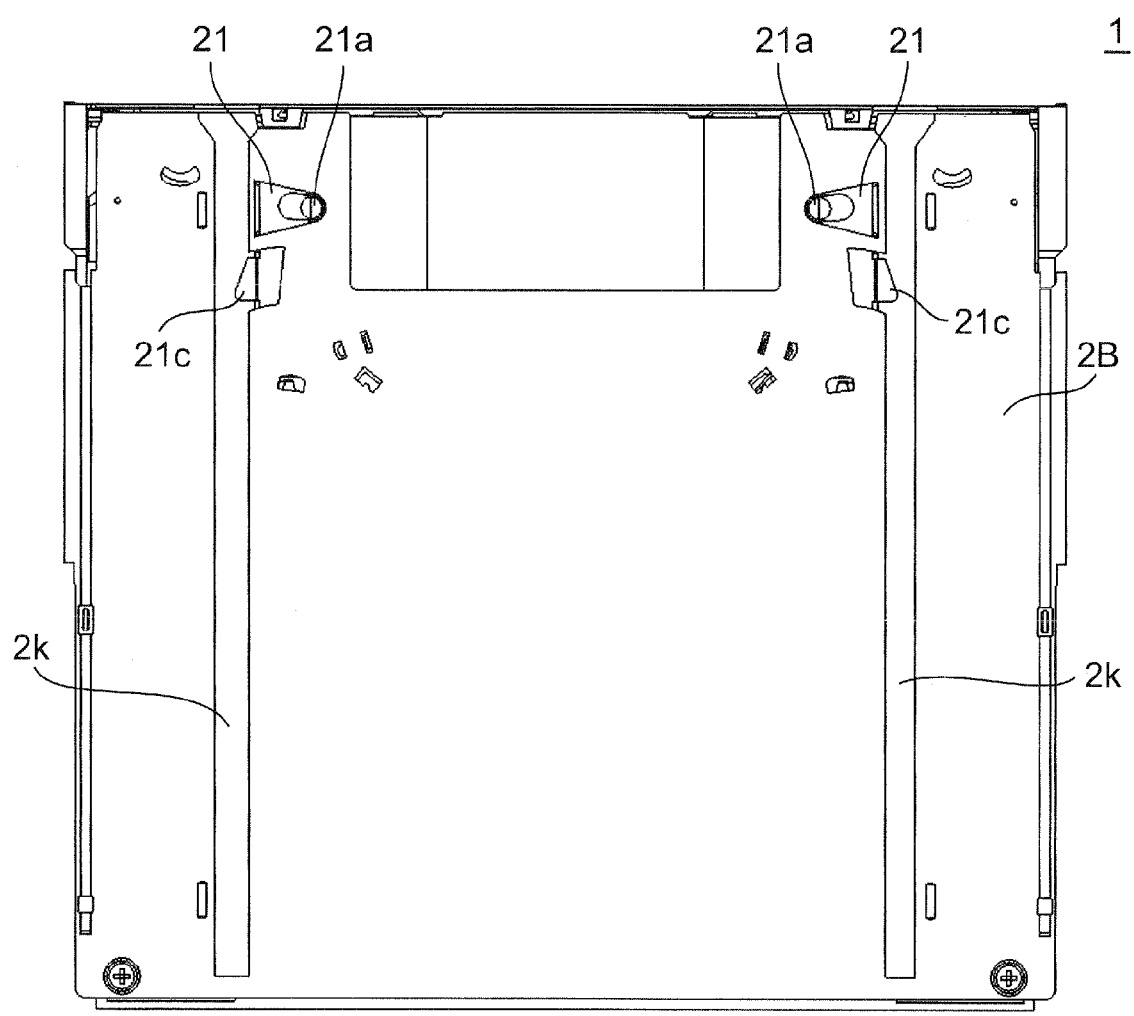
FIG. 14 is a bottom view of the lower case of the disc cartridge in FIG. 1.

Two fourth guide protrusions 64 are provided in an inner face of a bottom wall of the lower case 6B. The fourth guide protrusions 64 can slide in two guide grooves 2k provided in an outer face of the bottom wall of the lower case 2B of the disc cartridge 1 as shown in FIG. 14.

Two fifth guide protrusions 65 are provided in the inner face of the bottom wall of the lower case 6B. The fifth guide protrusions 65 can contact the respective protrusions 31d provided at the rear end of the slider 31 as shown in FIG. 3.

As shown in FIG. 13, the lower case 6B is provided with stoppers 66 that contact the slider 31 when the disc cartridge 1 is inserted into the disc device 6 to restrict movement of the cover 3 in the insertion direction X2. The stoppers 66 are provided on the inner faces of both side walls of the lower case 6B downstream from the first to fourth guide protrusions 61 to 64 in the insertion direction X2.

When the disc cartridge 1 is inserted into the disc device 6, the fourth guide protrusions 64 move in the guide grooves 2k, guiding movement of the disc cartridge 1 in the insertion direction X2. The second to third guide protrusions 62 to 63 restrict the guide grooves 2i to 2j, 31g to 31h to prevent excessive rattle.

Figure 15:
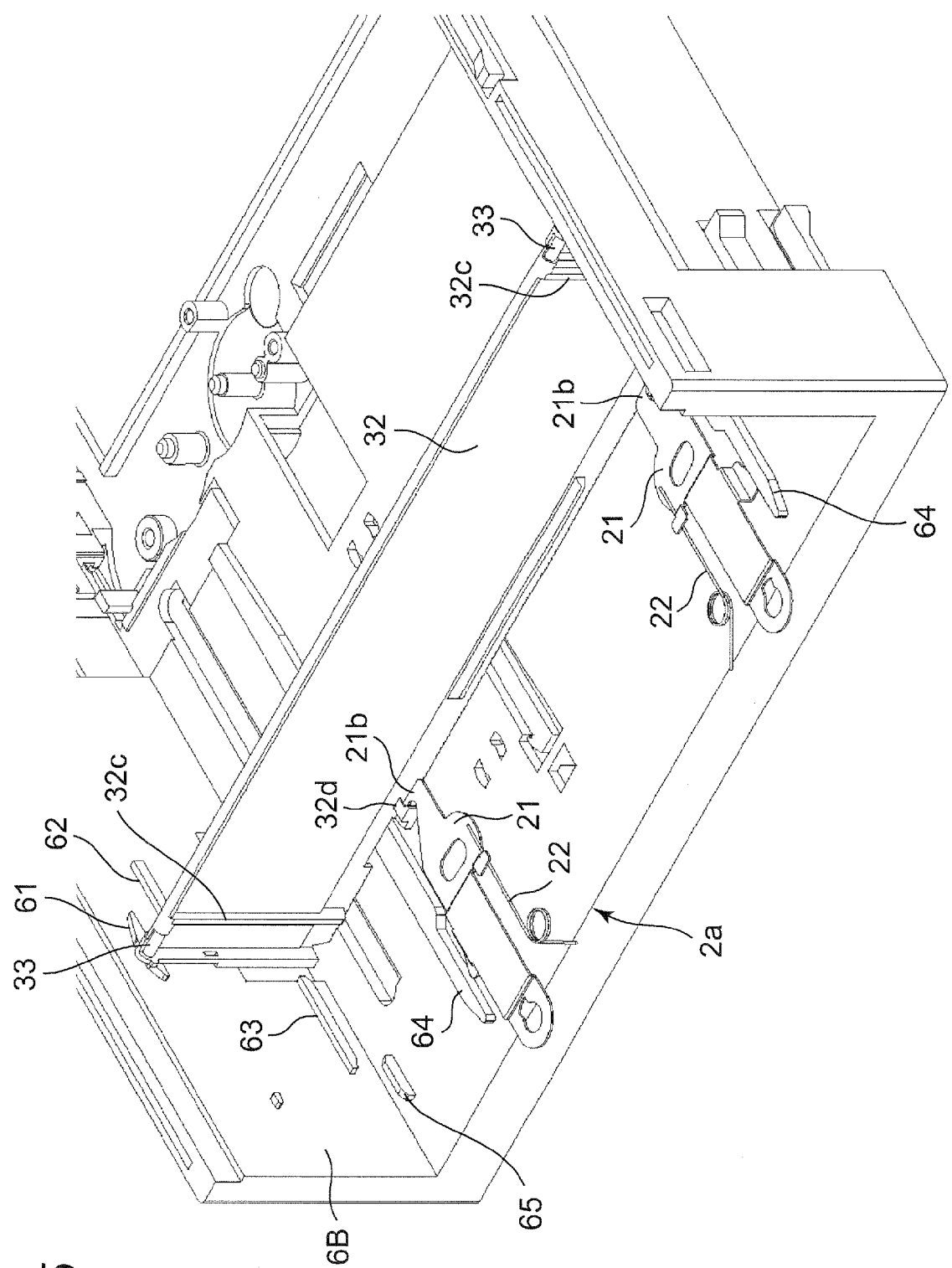
FIG. 15 is a perspective view showing the state where the hook of the lock arm engages with the hook of the shutter when the disc cartridge in FIG. 1 is inserted into the disc device in FIG. 10.

As shown in FIG. 14, a contact piece 21c as a part of the lock Arm 21 provided on the bottom wall of the lower case 2B protrudes in the guide groove 2k by biasing force of the torsion coil spring 22. When the disc cartridge 1 starts to be inserted into the disc device 6, as shown in FIG. 15, the hooks 21b of the lock arms 21 engage with the hooks 32d of the shutter 32, holding the shutter 32 in the closed state.

Figure 16:
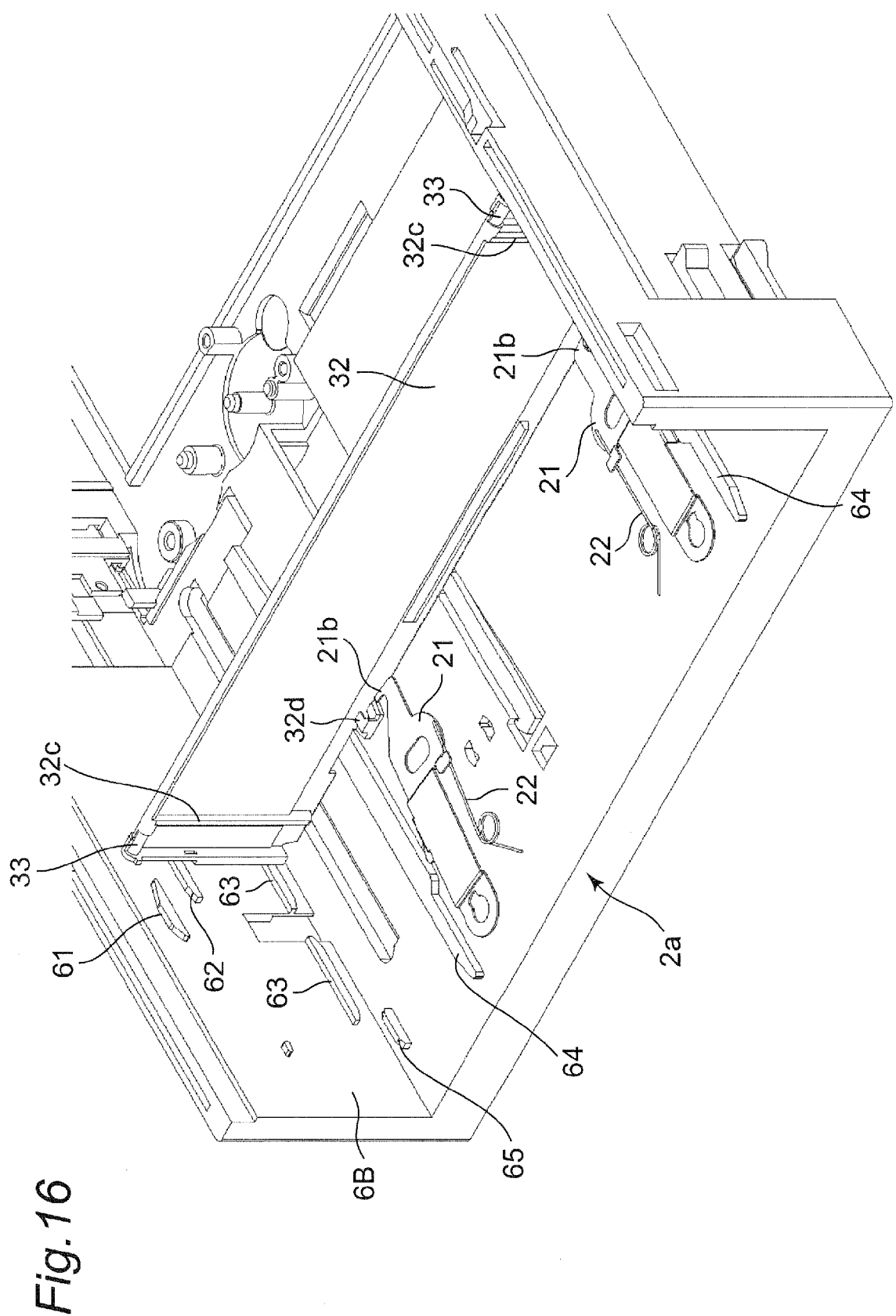
FIG. 16 is a perspective view showing the state where engagement between the hook of the lock arm and the hook of the shutter is released when the disc cartridge in FIG. 1 is inserted into the disc device in FIG. 10.

After that, when the disc cartridge 1 is further inserted in the insertion direction X2, the fourth guide protrusions 64 contact the contact pieces 21c, rotating the lock arms 21 against the biasing force of the torsion coil springs 22. As shown in FIG. 16, engagement between the hooks 21b of the lock arms 21 and the hooks 32d of the shutter 32 is released.

Figure 17:
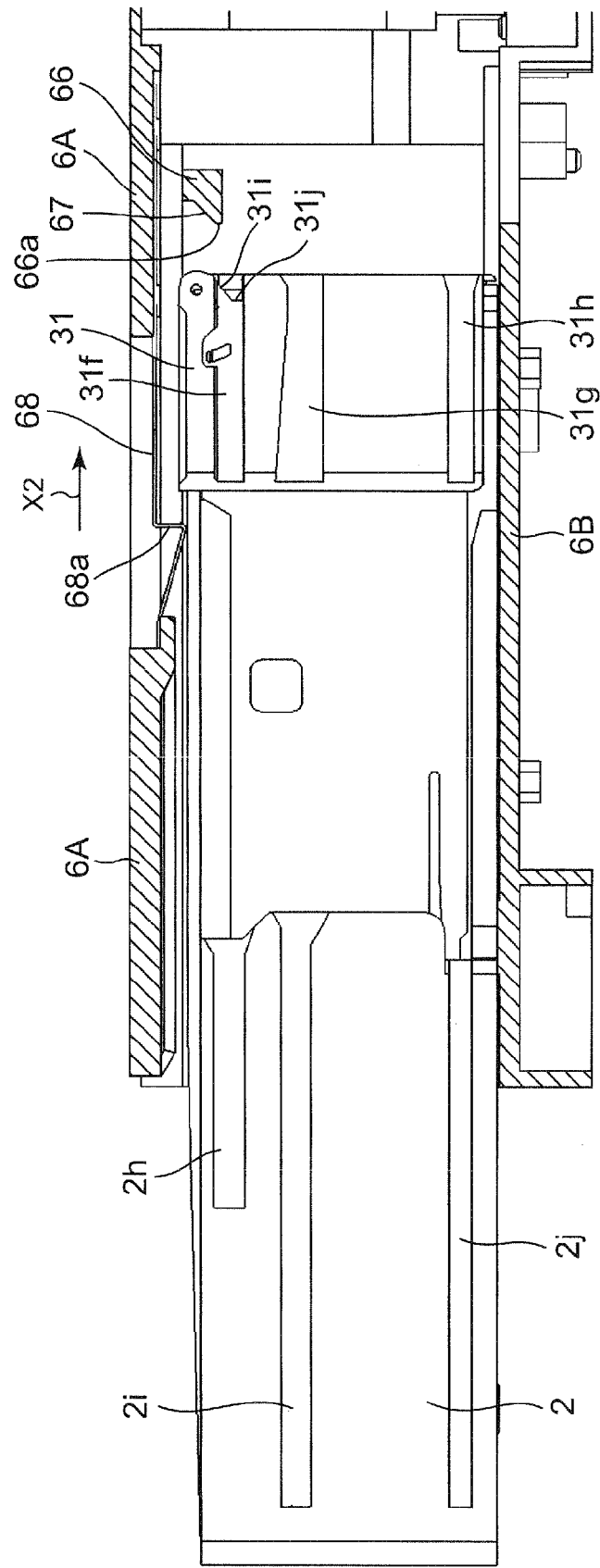
FIG. 17 is a partial sectional side view showing the state where the disc cartridge in FIG. 1 is being inserted into the disc device in FIG. 10.
Figure 18:
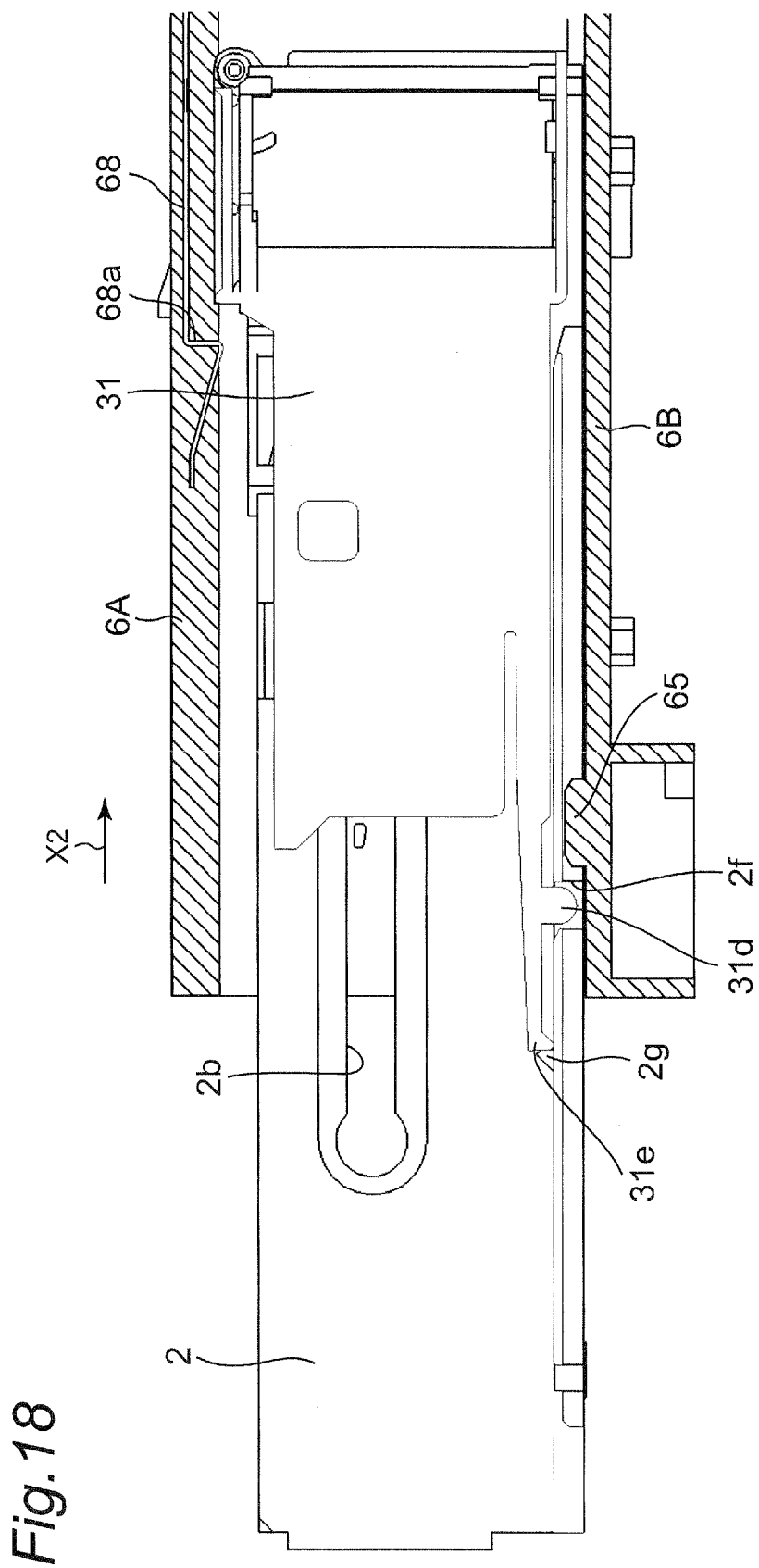
FIG. 18 is a partial sectional side view showing the state where the disc cartridge in FIG. 1 is being inserted into the disc device in FIG. 10.

FIG. 17 and FIG. 18 are partial sectional side views showing the state where the disc cartridge 1 is being inserted into the disc device 6 in the insertion direction X2. FIG. 17 is a view showing the state through the side wall of the lower case 6B of the disc device 6, and FIG. 18 is a view showing the state through the side wall of the lower case 6B of the disc device 6 and the side wall of the upper case 2A of the disc cartridge 1.

Figure 19:
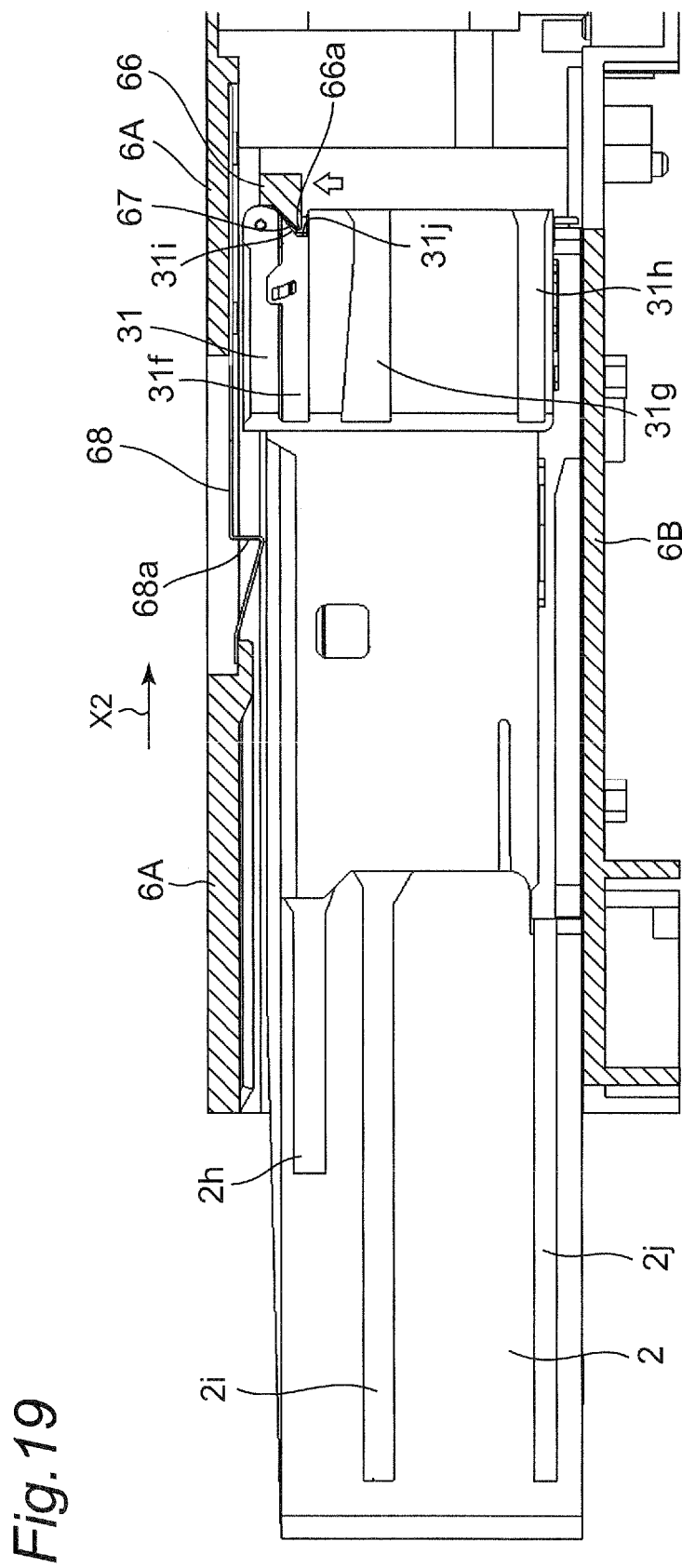
FIG. 19 is a partial sectional side view showing the state where the disc cartridge in FIG. 1 is further inserted into the disc device in FIG. 10 from the state shown in FIG. 17.
Figure 20:
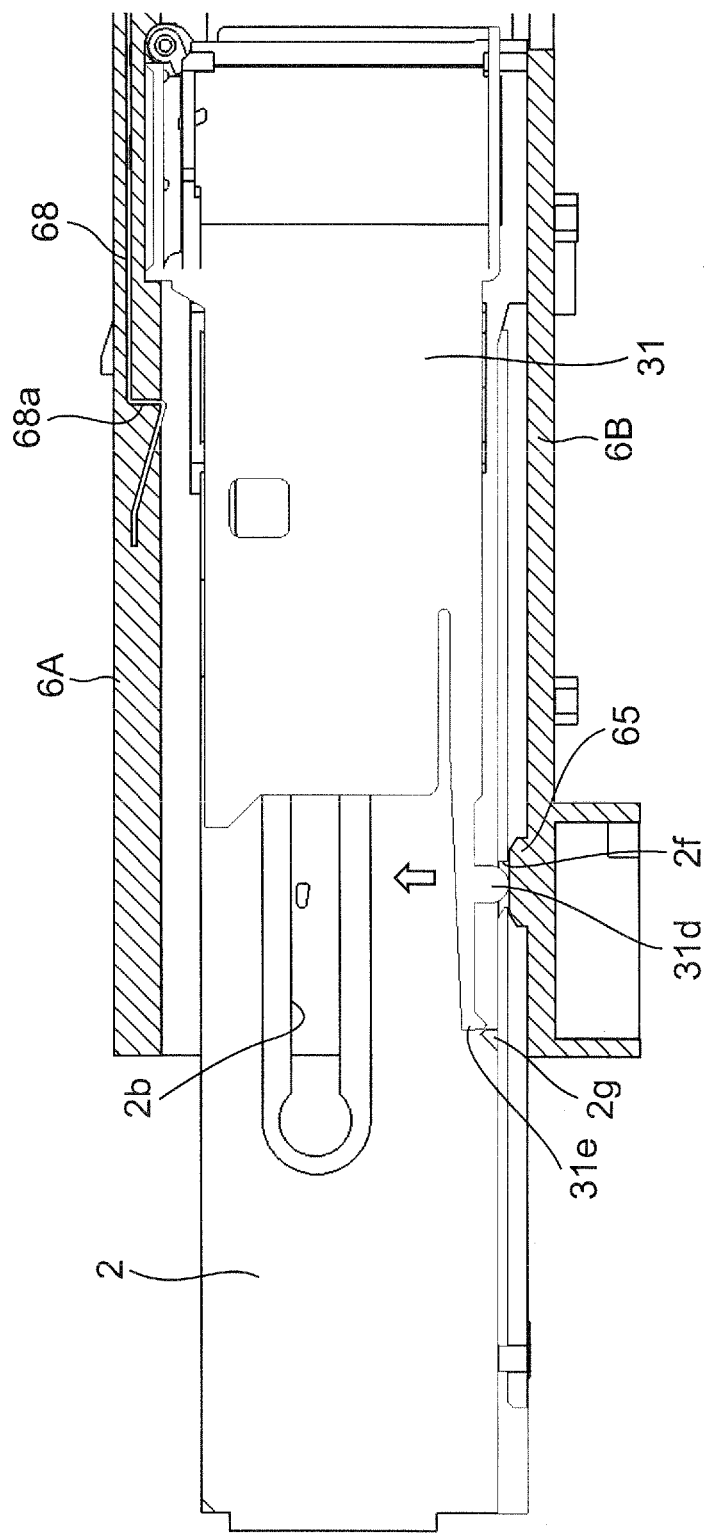
FIG. 20 is a partial sectional side view showing the state where the disc cartridge in FIG. 1 is further inserted into the disc device in FIG. 10 from the state shown in FIG. 18.

When the disc cartridge 1 is further inserted from the state shown in FIG. 17 and FIG. 18 in the insertion direction X2, as shown in FIG. 19, the slider 31 contacts the stoppers 66. As shown in FIG. 20, the fifth guide protrusions 65 push the protrusions 31d out of the through holes 2f, and rear ends 31e of the slider 31 are separated from the stoppers 2g.

The slider 31 contacts the stoppers 66 to restrict movement of the slider 31 in the insertion direction X2. On the other hand, the fifth guide protrusions 65 push the protrusions 31d out of the through holes 2f, and the rear ends 31e of the slider 31 are separated from the stoppers 2g, releasing locking of movement of the slider 31 relative to the casing 2. That is, the casing 2 can further move from the state shown in FIG. 19 and FIG. 20 in the insertion direction X2.

As shown in FIG. 17 and FIG. 19, the stoppers 66 each are provided with a cam part 67 inclined upward in the insertion direction X2. The slider 31 is provided with cutout portions 31j each having an inclined face 31i on which a front end 66a of the stopper 66 can slide.

Figure 21A:
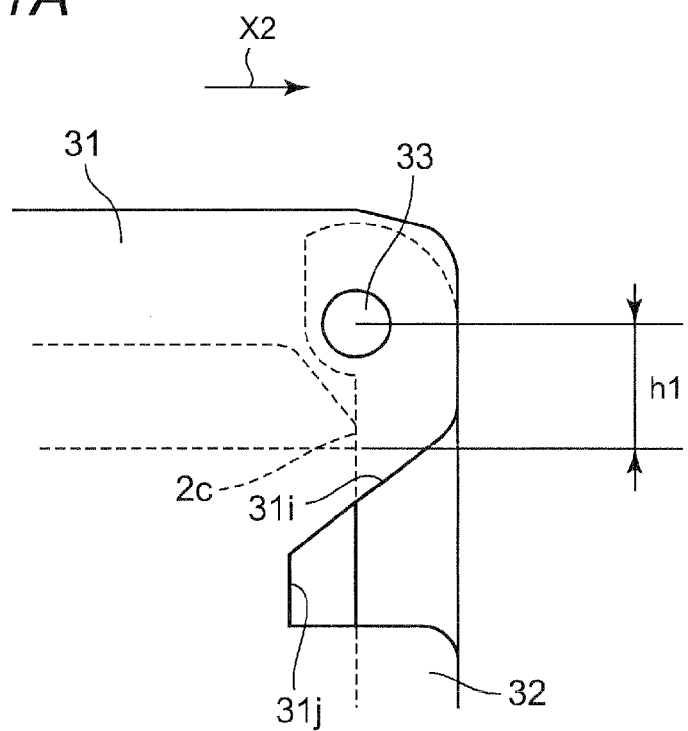
FIG. 21A is a side view schematically showing the state before a slider contacts a stopper.
Figure 21B:
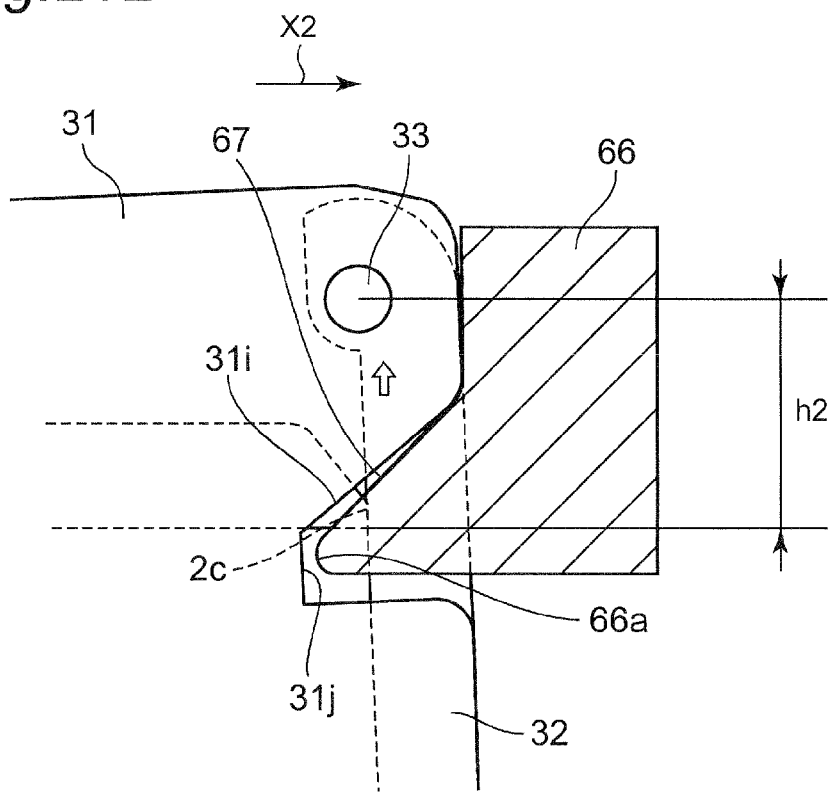
FIG. 21B is a side view schematically showing the state where the slider contacts the stopper, thereby causing a cam part to lift a hinge pin.

FIG. 21A is a side view showing the vicinity of the contact region between the shutter 32 and the front upper end 2c of the casing 2 before the slider 31 contacts the stopper 66. FIG. 21B is a side view showing the vicinity of the contact region between the shutter 32 and the front upper end 2c of the casing 2 after the slider 31 contacts the stopper 66.

When the slider 31 contacts the stoppers 66, the front ends 66a of the stoppers 66 slide on the inclined faces 31l of the slider 31 to lift the hinge pins 33. As a result, a distance h2 between the contact region of the shutter 32 and the front upper end 2c of the casing 2, and the hinge pin 33 in FIG. 21B becomes longer than a distance h1 in FIG. 21A. When the disc cartridge 1 is further inserted into the disc device 6 in the insertion direction X2, the front upper ends 2c of the casing 2 push the shutter 32, causing the shutter 32 to rotate about the hinge pins 33. Since the distance h2 is longer than the distance h1 at this time, the load to rotate the shutter 32 can be reduced, smoothly rotating the shutter 32. When or after the hinge pins 33 move so as to increase the distance h2, the inclined face 2m in FIG. 8 moves the slider 31 (at least rectangular top plate) in the moving direction of the hinge pins 33.

After that, when the disc cartridge 1 is further inserted to the position shown in FIG. 12 in the insertion direction X2, as shown in FIG. 2, the opening 2a is fully opened such that the disc 4 can be conveyed to the disc drive (not shown).

Figure 22:
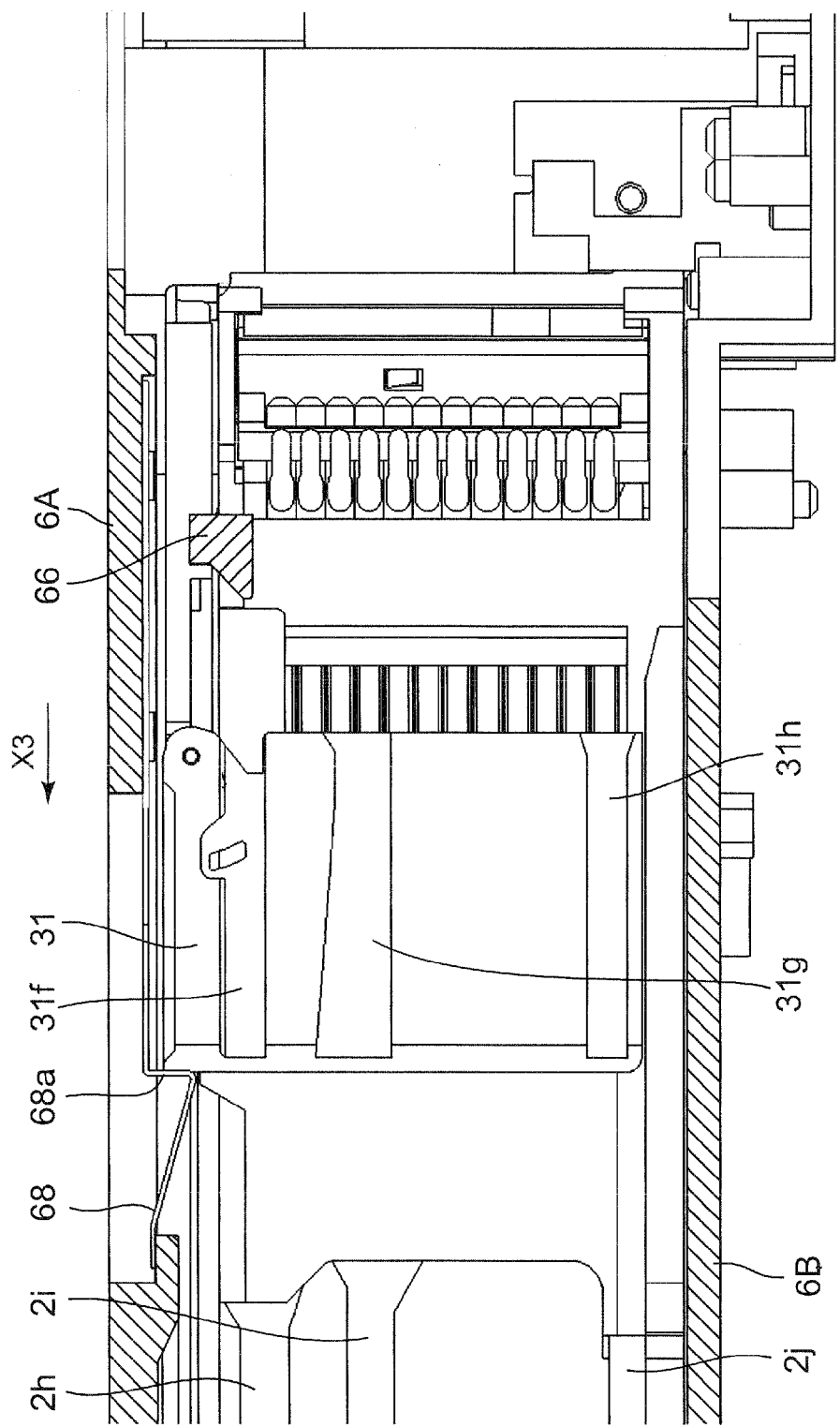
FIG. 22 is a side view showing the instant when a leaf spring contacts the slider when the disc cartridge in FIG. 1 is discharged from the disc device in FIG. 10.
Figure 23:
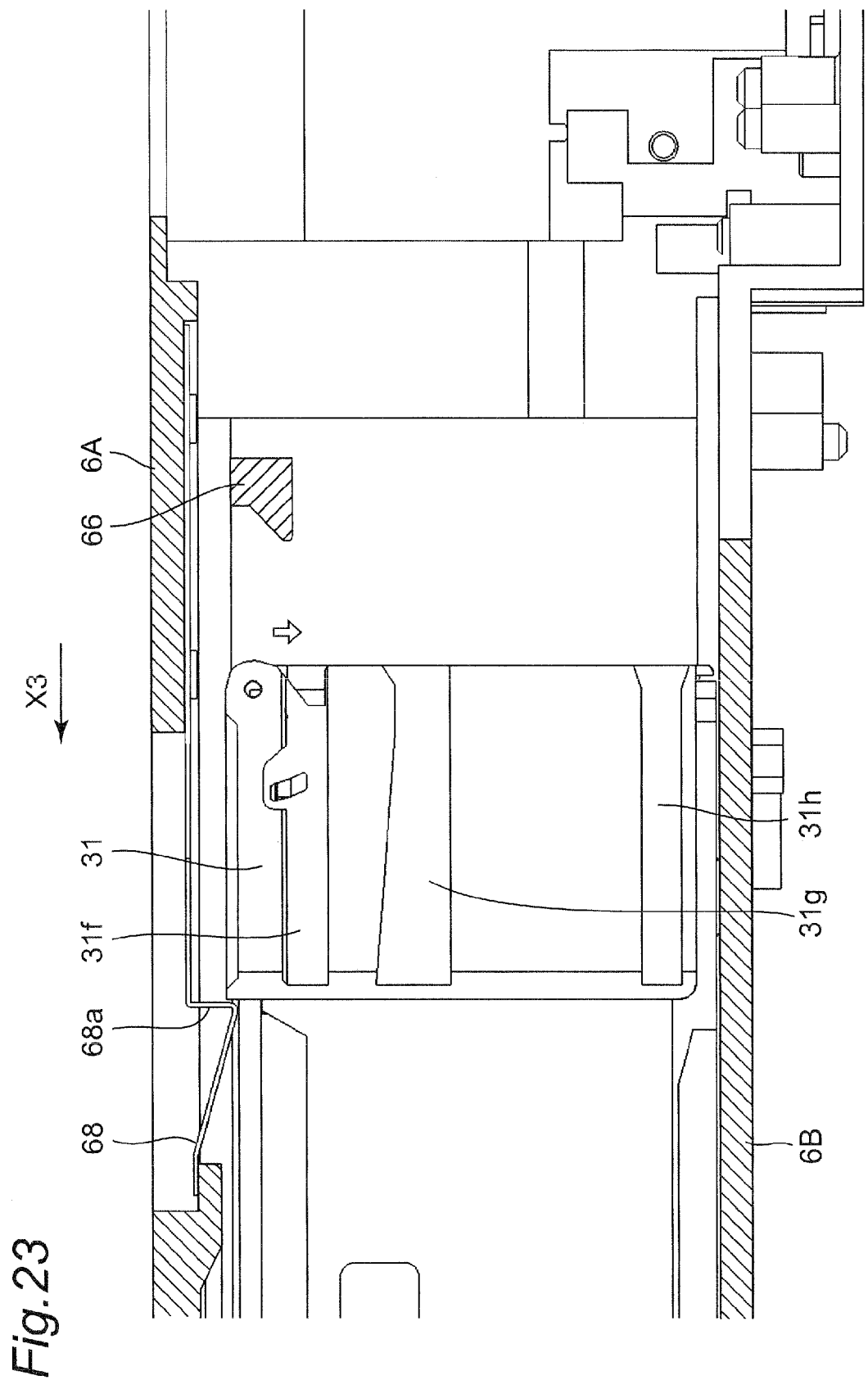
FIG. 23 is a side view showing the state where the disc cartridge in FIG. 1 is further discharged from the state shown in FIG. 22, and the slider is lowered by biasing force of the leaf spring.

As shown in FIG. 22 and FIG. 23, the upper plate 6A of the disc device 6 is provided with a leaf spring 68 for biasing the slider 31. The leaf spring 68 is attached to an inner face of the upper plate 6A with a screw (not shown) in a cantilevered manner. The leaf spring 68 has a stepped portion 68a that functions as a stopper for restricting movement of the slider 31 in a discharge direction X3 when the disc cartridge 1 moves from the inside of the disc device 6 in the discharge direction X3.

When the disc cartridge 1 further moves from the state shown in FIG. 22 in the discharge direction X3, the stepped portion 68a restricts movement of the slider 31 in the discharge direction X3, and the front upper ends 2c of the casing 2 move in the discharge direction X3. In this connection, the shutter 32 rotates about the hinge pins 33 to close the opening 2a. At this time, as shown in FIG. 21A, the cover 3 moves downward such that the distance between the contact region of the shutter 32 and the front upper end 2c of the casing 2, and the hinge pin 33 becomes smaller (h2 to h1). This results in the relative position between the leaf spring 68 and the slider 31 as shown in FIG. 23.

When the disc cartridge 1 further moves in the discharge direction X3 from the state shown in FIG. 23, the slider 31 moves below the stepped portion 68a of the leaf spring 68, lifting a free end of the leaf spring 68.

When the disc cartridge 1 further moves in the discharge direction X3, the fourth guide protrusions 64 (See FIG. 13) slide in the respective guide grooves 2k (See FIG. 14). As a result, contact between the fourth guide protrusions 64 and the contact pieces 21c of the lock arms 21 is released, and the lock arms 21 are rotated about the rotary shafts 21a by the biasing force of the torsion coil springs 22. Then, the contact pieces 21c return to the guide grooves 2k (See FIG. 14), and as shown in FIG. 15, the hooks 21b of the lock arms 21 engage with the hooks 32d of the shutter 32. Therefore, when the disc cartridge 1 is fully discharged from the disc device 6, the shutter 32 is held in the closed state.

In the disc device 6 in this embodiment, the stoppers 66 each have the cam part 67 that separate the hinge pin 33 from the contact region between the shutter 32 and the casing 2 when the casing 2 further moves in the insertion direction X2 in the state where the stoppers restrict movement of the slider 31 to rotate the shutter 32. This can reduce the load to rotate the shutter 32, and smoothly rotate the shutter 32.

In the disc device 6 in this embodiment, to discharge the disc cartridge 1 from the disc device 6, the shutter 32 is moved to close the opening 2a by biasing the slider 31 with the leaf spring 68. To reliably move the shutter 32 to close the opening 2a, it is needed to increase the force to bias the slider 31 with the leaf spring 68. However, in inserting the disc cartridge 1 into the disc device 6, when the force to bias the slider 31 with the leaf spring 68 is large, the load at insertion increases. In order to satisfy conflicting requirements, in the disc device 6 in this embodiment, the height of the slider 31 in contact with the leaf spring 68 is made different at insertion and discharge of the disc cartridge 1.

Figure 24:
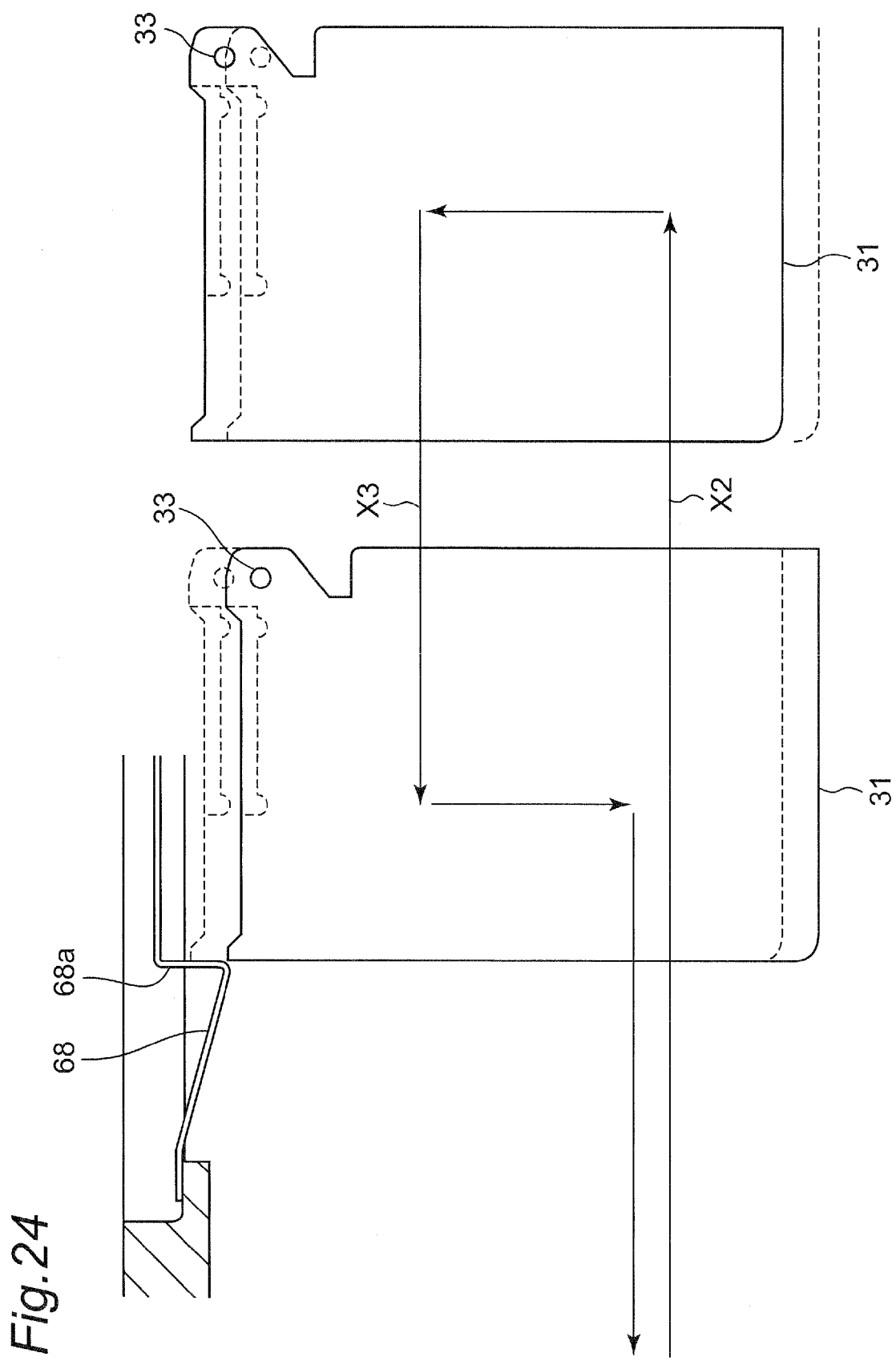
FIG. 24 is a side view schematically showing positional relationship between the slider and the leaf spring when the disc cartridge in FIG. 1 is inserted into and discharged from the disc device in FIG. 10.

More specifically, as shown in FIG. 24, when the disc cartridge 1 moves in the insertion direction X2, the slider 31 moves in the insertion direction X2 at a lower position before being lifted by the cam part 67, and contacts the leaf spring 68. On the contrary, when the disc cartridge 1 moves in the discharge direction X3, the slider 31 moves in the discharge direction X3 at a higher position after being lifted by the cam part 67, and contacts the leaf spring 68. Thereby, when the disc cartridge 1 is inserted into the disc device 6, the biasing force of the leaf spring 68 can be made small. On the other hand, when the disc cartridge 1 is discharged from the disc device 6, the biasing force of the leaf spring 68 can be made large, reliably moving the shutter 32 to close the opening 2a.

The embodiment has been described as an example of the technique disclosed in this application. However, the technique in the present disclosure is not limited to this, and may be applied to embodiments appropriately modified through change, replacement, addition, or omission. For example, although the disc cartridge 1 serves to store the plurality of discs 4 in the embodiment, the technique of the present disclosure is not limited to this. The disc cartridge 1 may serve to store one disc 4.

Although the stopper 66 is integral with the cam part 67 in the embodiment, the technique of the present disclosure is not limited to this. The stopper 66 and the cam part 67 may be separate members.

Although the leaf spring 68 for biasing the slider 31 is provided on the upper plate 6A of the disc device 6 in the embodiment, the technique of the present disclosure is not limited to this. For example, a leaf spring having the same function as the leaf spring 68 may be provided on the inner side face of the lower case 6B of the disc device 6 (for example, in the vicinity of the second guide protrusion 62). In this case, even when sliding of the leaf spring makes damage on the surface of the disc cartridge 1, the damage is not formed on the upper face of the disc cartridge 1, which is invisible to the user, and thus, is less represented. The leaf spring may be formed by making a substantially U-shaped through hole in the inner side face of the lower case 6B of the disc device 6. In this case, since the leaf spring is not a separate component, the number of components can be reduced.

Figure 25:
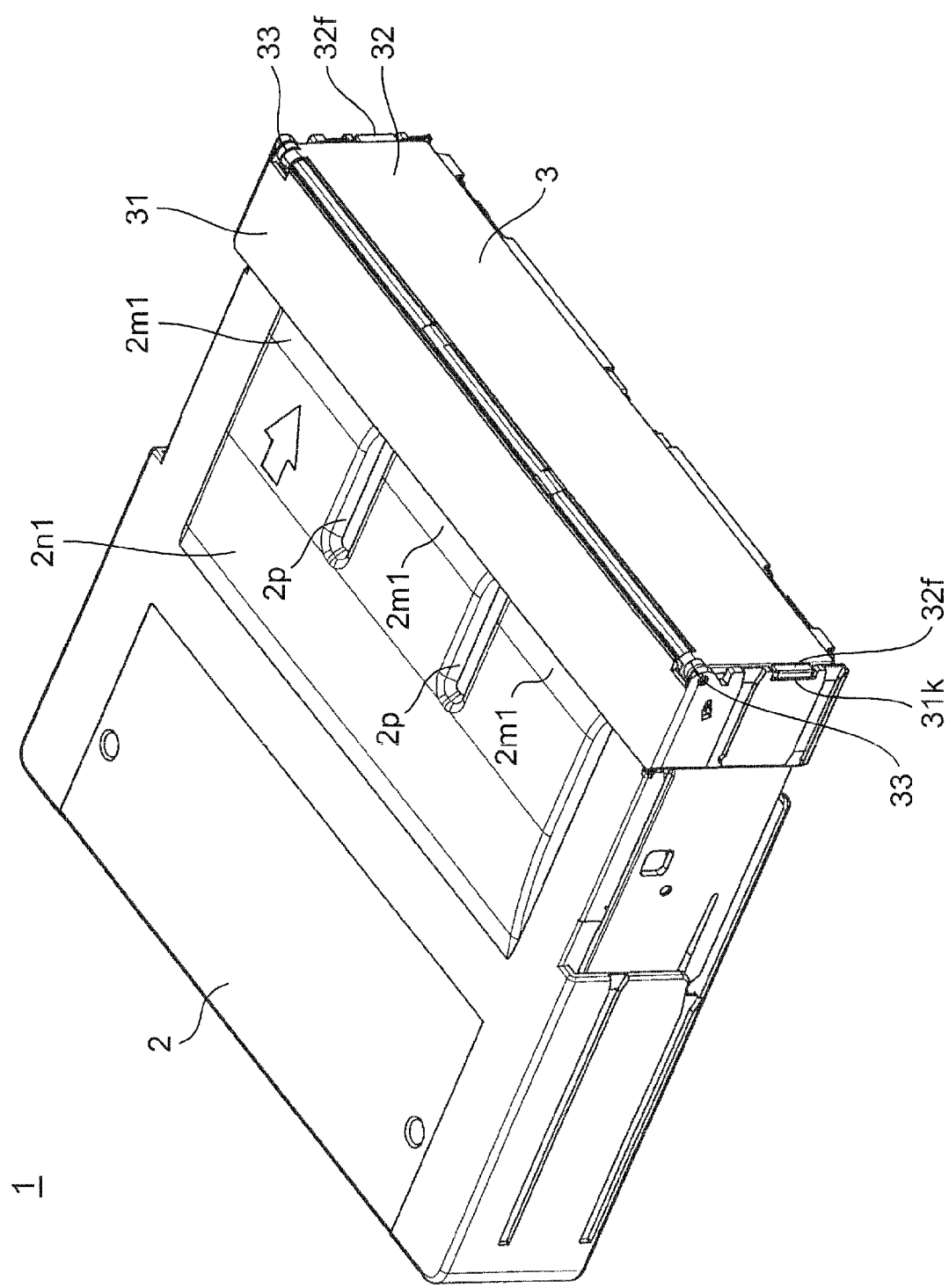
FIG. 25 is a perspective view of a disc cartridge in accordance with second embodiment in the state where a cover is closed.

In the embodiment, the inclined face 2*m* is formed on the upper face of the upper case 2A of the casing 2, and the flat face 2*n* extending from the top of the inclined face 2*m* toward the downstream side in the depth direction X1 is provided. However, the shapes of the inclined face 2*m* and the flat face 2*n* are not limited to the shapes shown in FIG. 8. For example, the inclined face 2*m*1 and the flat face 2*n*1 may be shaped as shown in FIG. 25. In this case, for example, recess portions 2*p* are provided so as not to contact the ribs 32*c* formed on the face of the shutter 32, which closes the opening 2*a*.

Figure 26:
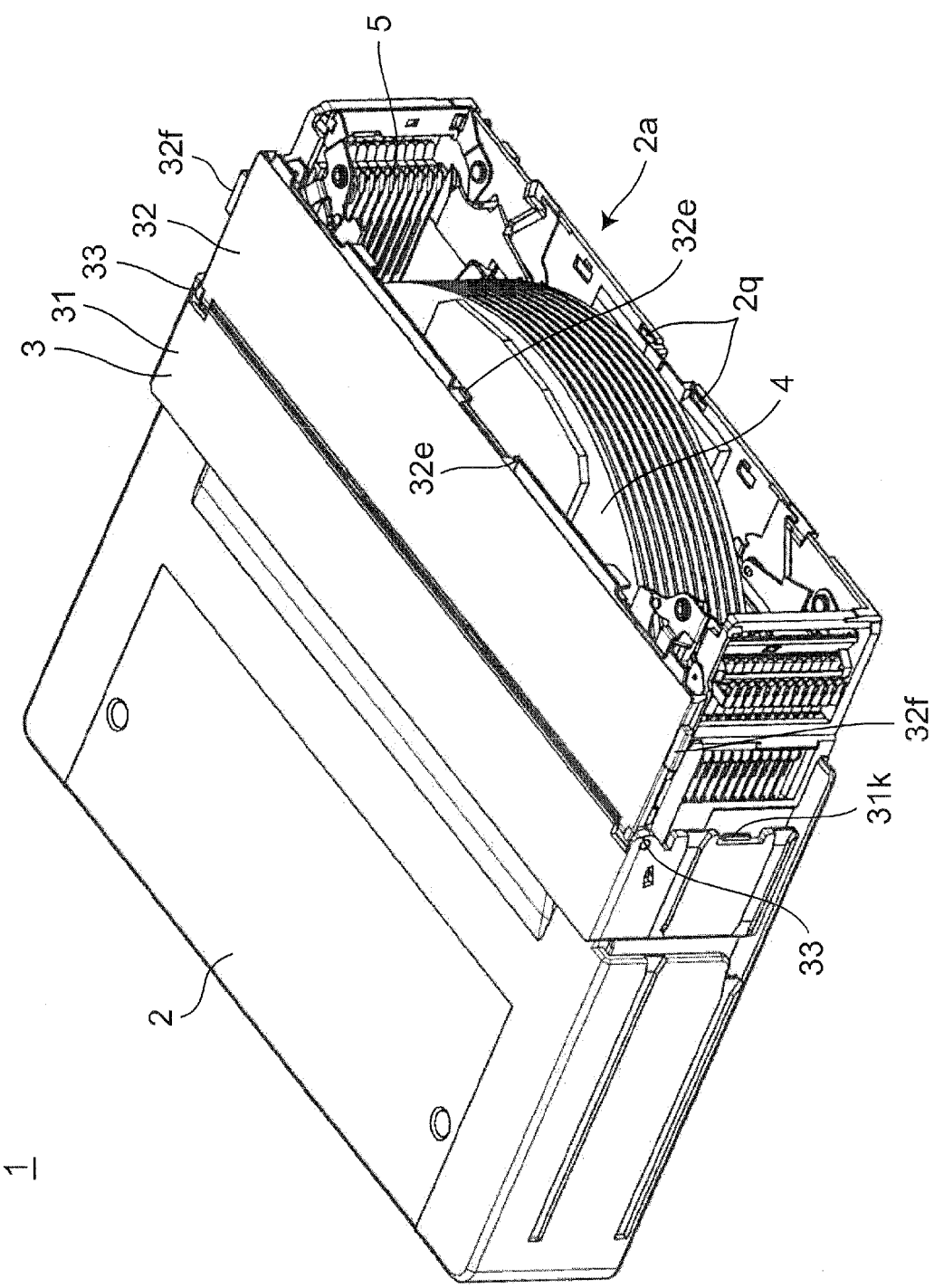
FIG. 26 is a perspective view showing the state where the cover of the disc cartridge in FIG. 25 is opened, and a disc is stored in the disc cartridge.
Figure 27:
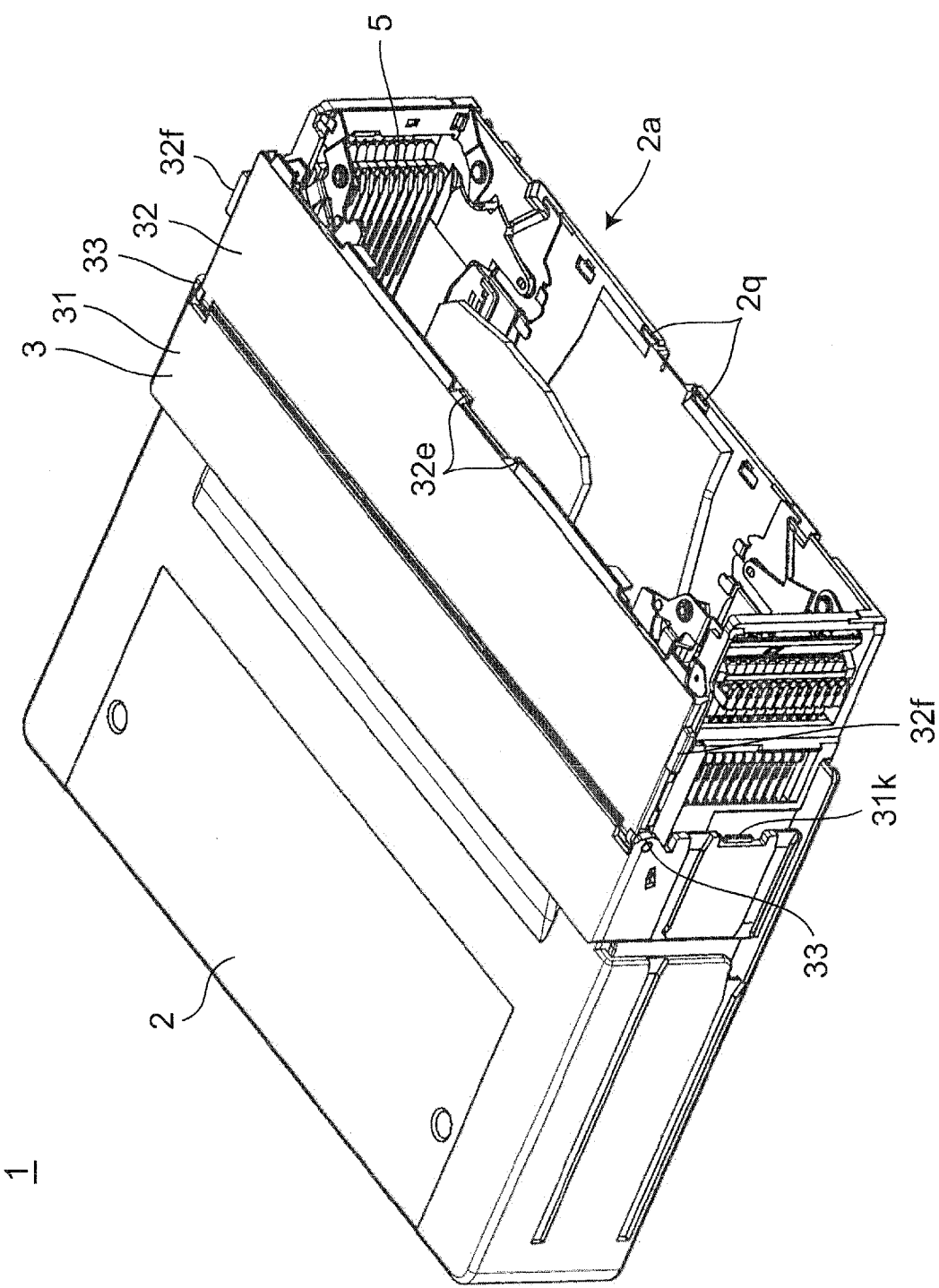
FIG. 27 a perspective view showing the state where the cover of the disc cartridge in FIG. 25 is opened, and the disc is not stored in the disc cartridge.
Figure 28:
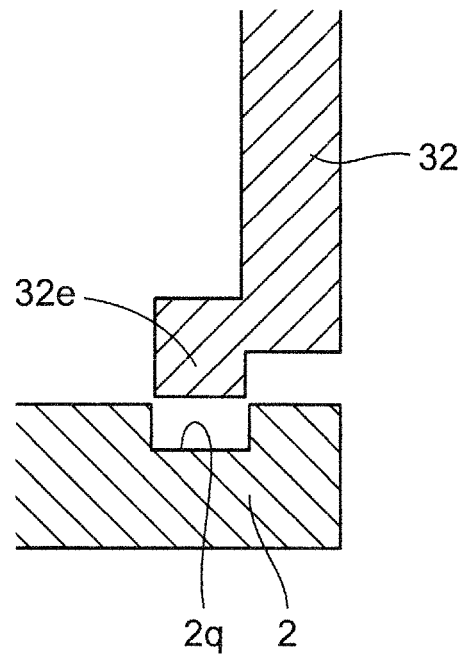
FIG. 28 is a partial enlarged sectional view schematically showing the state where the shutter of the cover in FIG. 25 opens the opening of the casing.
Figure 29:
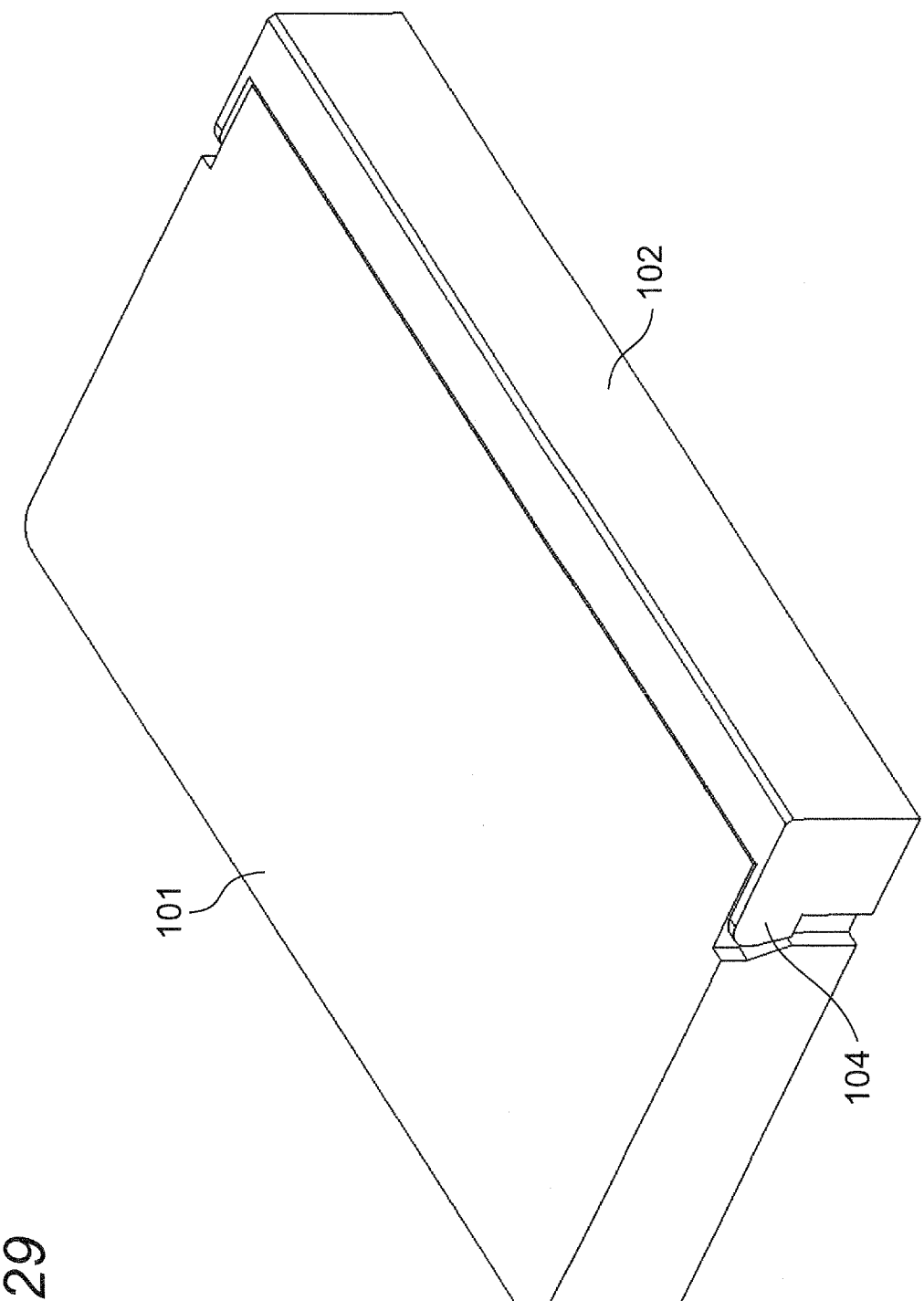
FIG. 29 is a perspective view showing of a conventional cartridge in the state where a cover is closed.
Figure 30:
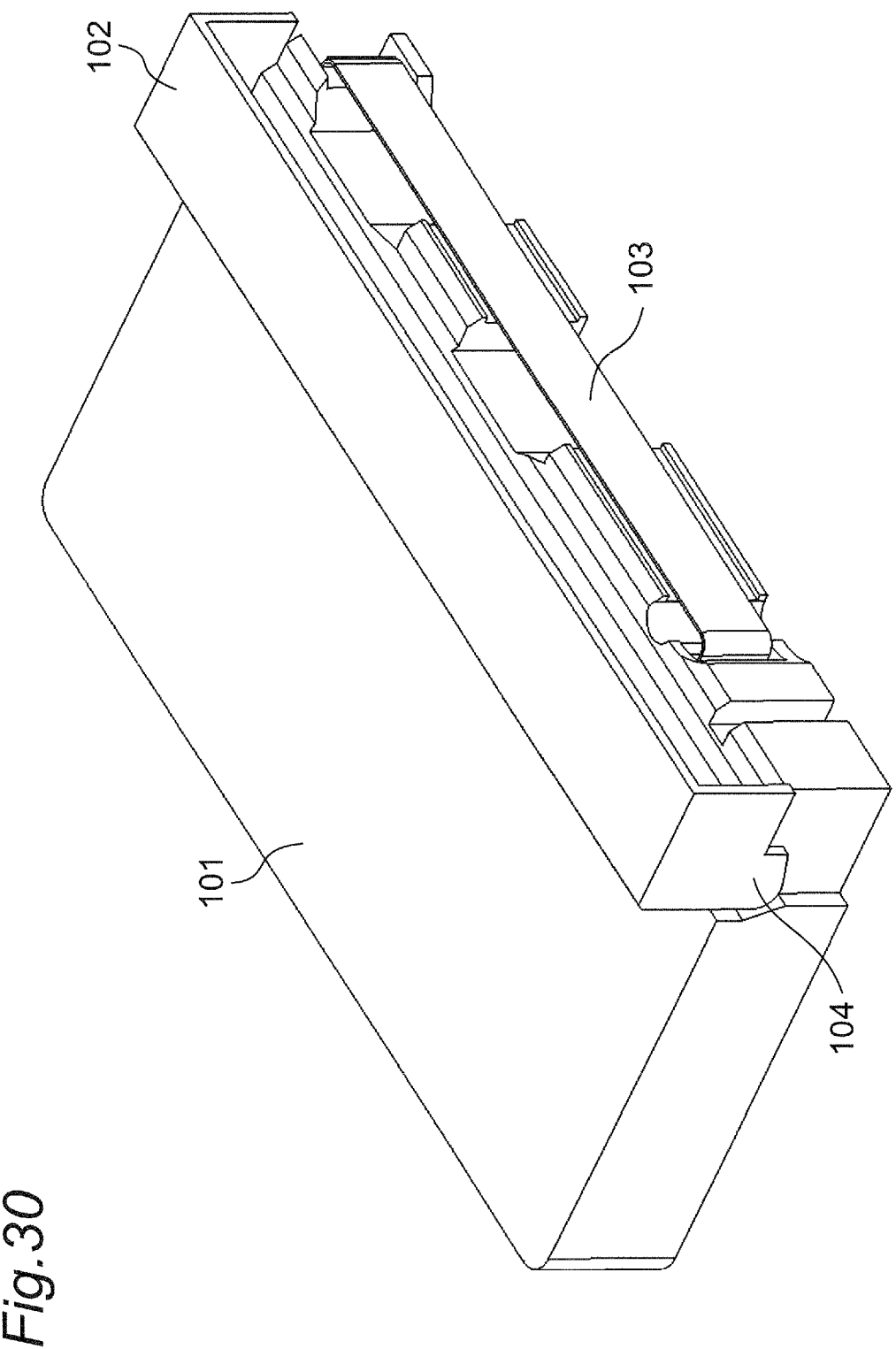
FIG. 30 is a perspective view showing of the conventional cartridge in the state where the cover is opened.

In the embodiment, as an example of the strut, as shown in FIG. 5, the stepped portion 2*d* provided on the front lower edge of the casing 2 engages with the stepped portion 32*b* provided at the lower end of the shutter 32. However, the technique of the present disclosure is not limited to this. For example, as shown in FIG. 26 to FIG. 28, recess portions 2*q* may be provided on the upper face of the casing 2 in the vicinity of front lower edge, and projections 32*e* may be provided on the lower end of the shutter 32, such that the projections 32*e* are located opposed to the recess portions 2*q* when the shutter 32 closes the opening 2*a*. With such configuration, when a force acts in the thickness direction of the casing 2, the projections 32*e* enter into the recess portions 2*q*, thereby causing the shutter 32 to function as a strut. At this time, even when a force acts in the direction intersecting thickness direction of the casing 2, since the projections 32*e* enter into the recess portions 2*q*, the shutter 32 can be prevented from shifting in the intersecting direction. This can allow the shutter 32 to function as the strut more reliably.

Although the recess portions 2*q* are provided on the upper face of the casing 2 in the vicinity of front lower edge and the projections 32*e* may be provided on the lower end of the shutter 32, the recess portions and the projections may be reversed. That is, the recess portions may be provided in one of the shutter 32 and the casing 2, and the projections may be provided on the other of the shutter 32 and the casing 2.

To position the shutter 32 to close the opening 2*a*, as shown in FIG. 26 and FIG. 27, the slider 31 may be provided with locking portions 31*k*, and the shutter 32 may be provided with locked portions 32*f*.

The disc cartridge and the disc device of the present disclosure can be slimmed and miniaturized and thus, are especially suitable for a disc device that records or reproduces information in or from the disc stored in the disc cartridge.

What is claimed is:

1. A disc device recording or reproducing information in or from a disc stored in a disc cartridge, wherein
   the disc cartridge includes:
      a casing having a front face with an opening configured to receive the disc; and
      a cover configured to open and close the opening of the casing, the cover includes:
      a slider configured to move along a side face of the casing;
      a shutter configured to close the opening; and
      a hinge part configured to rotatably couple the shutter to the slider, and
   the disc device includes:
      a stopper configured to contact the slider when the disc cartridge is inserted into the disc device to restrict movement of the slider in an insertion direction; and
      a cam part configured to separate the hinge part from a contact region between the shutter and the casing when or before the casing further moves in the insertion direction with the stopper restricting movement of the slider in the insertion direction and the shutter is pressed by the casing to rotate about the hinge part.

2. The disc device according to claim 1, wherein the casing includes an inclined face configured to move the slider in the same direction as a direction in which the hinge part moves when or after the casing moves in the insertion direction and the hinge part is moved by the cam part so as to be away from the contact region.

3. The disc device according to claim 2, wherein the inclined face is inclined from an inner side toward an outer side of the casing in a thickness direction of the casing, along the insertion direction.

4. The disc device according to claim 2, wherein the casing includes a flat face extending from a top of the inclined face toward an upstream side in the insertion direction, and
   in the state where the shutter closes the opening, the flat face is substantially flush with a part of an outer face of the slider.

5. A disc cartridge to be inserted and used in a disc device, the disc cartridge comprising:
   a casing having a front face with an opening configured to receive a disc; and
   a cover configured to open and close the opening of the casing, wherein the cover includes:
   a slider configured to move along a side face of the casing and come into contact with a stopper and a cam part of the disc device when the disc cartridge is inserted into the disc device in a depth direction of the disc cartridge;
   a shutter configured to close the opening; and
   a hinge part configured to rotatably couple the shutter to the slider, and
   the disc cartridge is configured such that, when the slider moves with respect to the casing in the depth direction away from the opening by contact of the slider with the stopper of the disc device, the shutter is pressed by the casing to rotate about the hinge part, the opening is opened, and the hinge part is separated from a contact region between the shutter and the casing by contact of the slider with the cam part of the disc device.

6. The disc cartridge according to claim 5, wherein the casing includes an inclined face configured to move the slider so as to separate the hinge part from the contact region when the slider moves in the depth direction.

7. The disc cartridge according to claim 6, wherein the inclined face is inclined from an inner side toward an outer side of the casing in a thickness direction of the casing, along the depth direction.

8. The disc cartridge according to claim 6, wherein the casing includes a flat face extending from a top of the inclined face toward a downstream side in the depth direction, and
   in the state where the shutter closes the opening, the flat face is substantially flush with a part of an outer face of the slider.

9. The disc cartridge according to claim 5, wherein the shutter functions as a strut configured to prevent the casing from bending in a thickness direction when the shutter closes the opening.

10. The disc cartridge according to claim 9, wherein one of the shutter and the casing is provided with a recess portion,
   the other of the shutter and the casing is provided with a projection configured to be received in the recess portion, and
   in the state where the shutter closes the opening, the projection is located opposed to the recess portion.

11. The disc cartridge according to claim 10, wherein when a force acts in the thickness direction of the casing in the state where the shutter closes the opening, the projection enters into the recess portion to restrict movement of the shutter.

12. The disc cartridge according to claim 5, wherein a rib extending in a thickness direction of the casing is provided on a face of the shutter, the face closing the opening.

* * * * *